United States Patent
Malaby et al.

(10) Patent No.: US 10,602,232 B1
(45) Date of Patent: *Mar. 24, 2020

(54) CROSS PLATFORM APPLICATION CONTROL IN AN INTERACTIVE, MULTI-PLATFORM VIDEO NETWORK

(71) Applicant: Music Choice, Horsham, PA (US)

(72) Inventors: Stephen D. Malaby, Devon, PA (US); Bryan J. LeBlanc, Hamilton, NJ (US); Dow Seng Lam, Princeton, NJ (US); Mateti Siva Ram, Malvern, PA (US); Ivan Fokin, Spring City, PA (US); Peter H. D. Glenn, Exton, PA (US); Robert A. Decker, Sanatoga, PA (US); Fei Wan, Warrington, PA (US); Qingrui Liu, Wilmington, DE (US); Angelica Casey, Derry, NH (US); Alan Christopher Hummel, Levittown, PA (US); Kevin Todd Boone, Jamison, PA (US)

(73) Assignee: MUSIC CHOICE, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,263

(22) Filed: Nov. 9, 2017

Related U.S. Application Data

(63) Continuation of application No. 15/048,013, filed on Feb. 19, 2016, now Pat. No. 9,820,005, which is a continuation of application No. 14/334,250, filed on Jul. 17, 2014, now Pat. No. 9,271,019, which is a continuation of application No. 12/857,255, filed on Aug. 16, 2010, now Pat. No. 8,789,124, which is a continuation of application No. 12/790,481, filed on May 28, 2010, now abandoned.

(51) Int. Cl.
| | |
|---|---|
| H04N 21/458 | (2011.01) |
| H04N 21/262 | (2011.01) |
| H04N 21/488 | (2011.01) |
| H04N 21/81 | (2011.01) |
| H04N 21/6543 | (2011.01) |
| H04N 21/43 | (2011.01) |
| H04N 21/242 | (2011.01) |
| H04N 21/2665 | (2011.01) |

(52) U.S. Cl.
CPC ....... *H04N 21/4882* (2013.01); *H04N 21/242* (2013.01); *H04N 21/262* (2013.01); *H04N 21/2665* (2013.01); *H04N 21/4302* (2013.01); *H04N 21/458* (2013.01); *H04N 21/6543* (2013.01); *H04N 21/8166* (2013.01)

(58) Field of Classification Search
CPC ............ H04N 21/812; H04N 21/2353; H04N 21/237; H04N 21/4316; H04N 21/8583
See application file for complete search history.

(56) References Cited

U.S. PATENT DOCUMENTS

| | | | |
|---|---|---|---|
| 6,049,332 A | 4/2000 | Boetje et al. | |
| 6,772,219 B1 | 8/2004 | Shobatake | |
| 7,197,715 B1 | 3/2007 | Valeria | |
| 2003/0084453 A1 | 5/2003 | Laughlin et al. | |

(Continued)

*Primary Examiner* — Kieu Oanh T Bui
(74) *Attorney, Agent, or Firm* — Rothwell, Figg, Ernst & Manbeck, P.C.

(57) ABSTRACT

In one aspect, the invention provides an interactive, multi-platform video network. In another aspect, the invention provides a dynamic scheduling method.

24 Claims, 22 Drawing Sheets

(56) References Cited

U.S. PATENT DOCUMENTS

2005/0137958 A1* 6/2005 Huber .................... G06Q 30/02
705/37
2011/0243533 A1 10/2011 Stern et al.
2015/0281755 A1* 10/2015 Shusman ............... H04H 20/38
725/13

* cited by examiner

CROSS PLATFORM APPLICATION CONTROL IN AN INTERACTIVE, MULTI-PLATFORM VIDEO NETWORK

CROSS-REFERENCE TO RELATED APPLICATIONS

This application is a continuation of U.S. application Ser. No. 15/048,013, filed Feb. 19, 2016 (projected to issue as U.S. Pat. No. 9,820,005), which is a continuation of U.S. application Ser. No. 14/334,250, filed Jul. 17, 2014 (now U.S. Pat. No. 9,271,019), which is a continuation of U.S. application Ser. No. 12/857,255, filed on Aug. 16, 2010 (now U.S. Pat. No. 8,789,124), which is a continuation of U.S. application Ser. No. 12/790,481, filed May 28, 2010 (abandoned). The above identified applications and patents are hereby incorporated by reference.

BACKGROUND

Faced with competition from, among other things, video streaming over the Internet, conventional music video television channels have faced challenges in retaining viewers. As a consequence, some providers of music video television channels have changed the format of their channels away from music videos and towards reality-based television shows. What is needed is an improvement to conventional television channels that will facilitate the retention and expansion of viewers.

SUMMARY

Described herein are various embodiments of an interactive, multi-platform video network that provides one or more channels of interactive, video programming. The interactivity of the described network provides advantages over conventional video networks. For example, by providing interactivity, consumers of a video channel can have greater participation by, for example, submitting content that may air on the channel and/or influencing the videos that will be played on the channel (e.g., by submitting voting).

One difficulty in providing an interactive, multi-platform video network is ensuring synchronization between the various platforms, which may include a television/passive set-top-box (STB) (e.g., a one way STB or a two-way STB without EBIF or other interactive TV software) and an interactive, communication device platform (i.e., a device that can transmit and receive—e.g., a personal computer or game console with networking capabilities, a smart phone, etc), which is also referred to as the "broadband platform." In one aspect, the present invention provides solutions to this problem.

For example, in one embodiment, the invention provides an interactive, multi-platform video network that includes a automation system that is able to control not only what appears on the television sets that are tuned to an interactive channel provided by the network, but also what appears on the broadband communication devices that are configured to receive the interactive channel or display information related to the interactive channel. Advantageously, in some embodiments, a schedule created for the automation system instructs the sub-system when to (1) send various triggers to the transmitter, which is connected to a multitude of TVs via one or more networks and controls what appears on the TVs that are tuned to the channel, and (2) send various triggers to communication devices (e.g., communication devices tuned to the interactive channel), thereby controlling the communication devices, at least to some degree.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
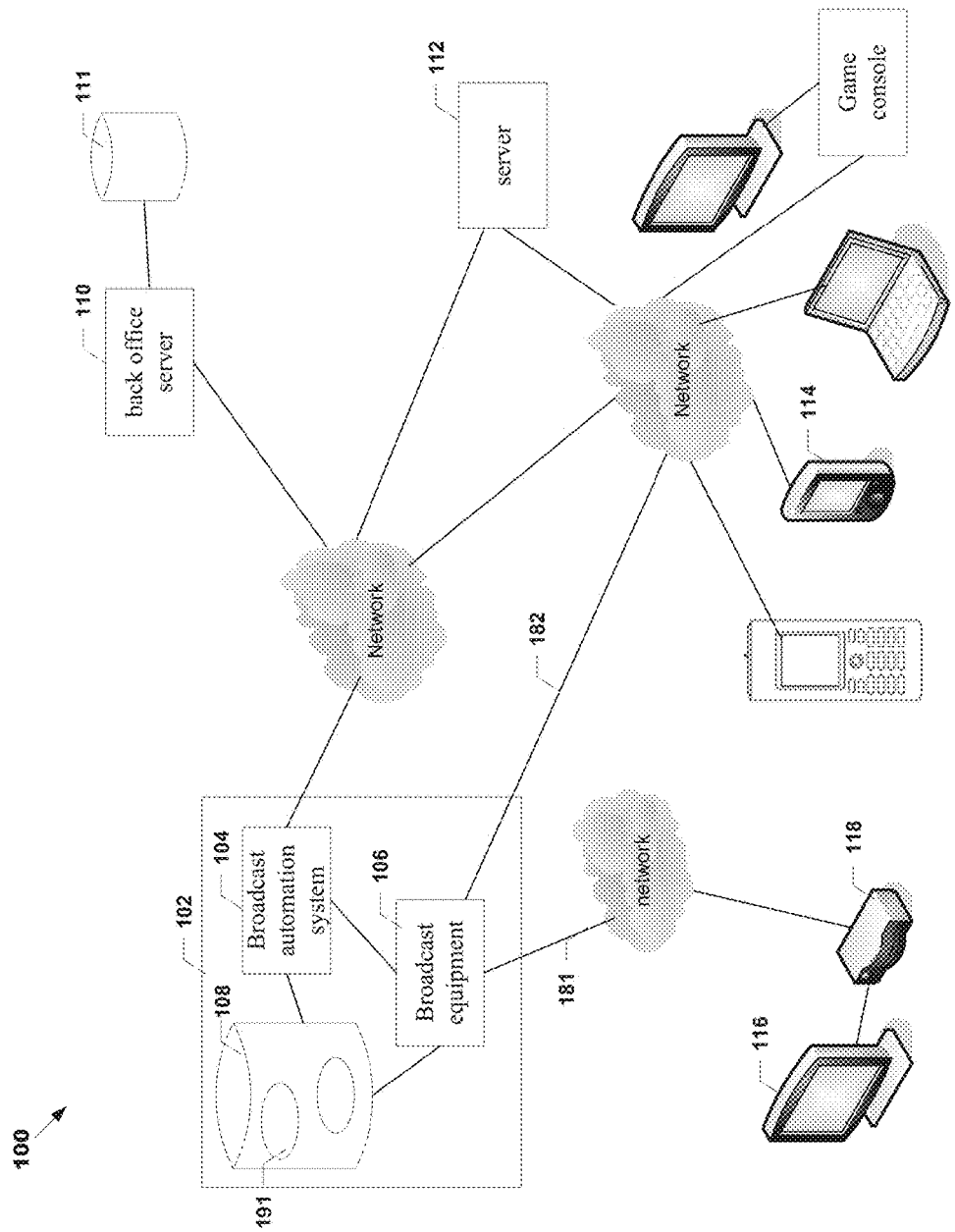
FIG. 1 illustrates an interactive, multi-platform video network according to an embodiment of the invention.

Referring now to FIG. 1, FIG. 1 illustrates an interactive, multi-platform video network (i.e., system) 100 according to an embodiment of the invention. For the sake of simplicity and brevity, we shall assume that system 100 provides a single, interactive, music video channel, but the invention is not limited to a single channel. Nor is there a requirement that the video content be music videos. For example, the video content may be any previously recorded video content or live video content, such as live video from a sporting event (e.g., football game, baseball game, basketball game), concert, newscast, etc.

System 100 includes a broadcast system 102 for outputting video streams for the interactive music video channel. In the example of FIG. 1, broadcast system 102 outputs two digital video streams: video stream 181 and video stream 182. In one embodiment, video stream 181 is configured such that is can be processed by a television 116 and/or a passive receiving device (e.g., passive set-top-box) 118 and video stream 182 is adapted such that it can be processed by software running in a broadband capable communication device 114. For example, video stream 181 may be an MPEG video stream that contains a standard definition and/or high definition digital television signal, and video stream 182 may be a Flash Video (FV) video bit stream.

Figure 22:
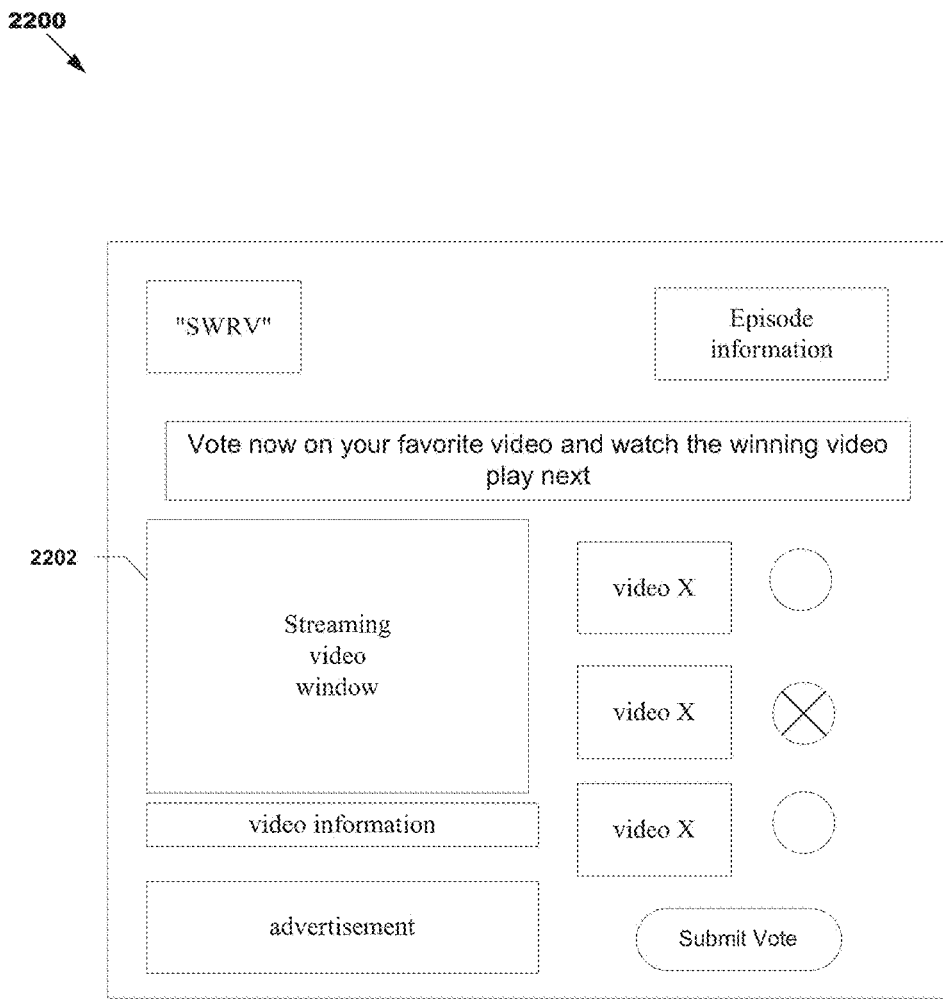
FIG. 22 illustrate an example user interface.

Advantageously, in some embodiments, streams 181 and 182 encode the same video and are output at the same time or substantially the same time (e.g., not more than 5 seconds apart in some embodiments). While streams 181 and 182 may encode the same video, it may be that stream 181 contains additional video elements (e.g., overlay elements) that are not included in stream 182, but in other embodiments the content of stream 182 is the same as the content of 181. By producing the two streams 181, 182, a user of television 116 and a user of communication device 114 can tune to the interactive video channel and watch the same music video at the same time (or substantially the same time). In some embodiments, a user of television 116 tunes to the interactive video channel the same way the user tunes to any television channel. In some embodiments, a user of communication device 114 tunes to the interactive video channel by transmitting a request (e.g., an HTTP GET request) to a server 112, which responds by transmitting to device 114 a certain end user application (i.e., software) that, in some embodiments, may be configured to automatically request and receive stream 182 and display on a display of device 114 (or on a monitor or TV attached to the device) a user interface that includes, among other elements, a window in which the video encoded in stream 182 is displayed. In other embodiments, the end user application does not receive and display the video, but simply displays information related to the interactive channel (e.g., information related to the video that is currently airing in the channel). FIG. 22 is an example of a user interface 2200. In the example shown in FIG. 22, the end user application receives stream 182 and displays in window 2202 the music video encoded in stream 182. As further shown in FIG. 22, user interface 2200 may include, in addition to window 2202, a number of other elements for displaying information to the end user. As discussed herein, the content of user interface 2200 is controlled, at least to some degree, by a automation system 104.

System 100 is designed such that a program (e.g., a show) provided on the interactive video channel may be interactive. That is, for example, an episode of the program may prompt the user to (1) make a selection (e.g., vote for a video or artist) and/or (2) submit content (e.g., text message, still image, video) that may be selected to appear in an episode of the program. In the embodiments where a user is prompted to vote for a video, the video that receives the most votes may be selected as the next video that will play on the channel. In this way, not only is the channel interactive, but the users may have some control over what primary content will appear on the channel.

As shown in FIG. 1, broadcast system 102 includes transmitter 106 that is used to produce and output streams 181 and 182. As is known in the art, transmitter 106 typically includes devices to composite multiple videos, audios, and onscreen graphics into a single video signal; digital encoding devices to compress the video signal for transmission; and can include devices to multiplex multiple broadcast channels (e.g., TV channels or other broadcast channels) for transmission. In one embodiment, transmitter 106 includes an Inscriber(R) graphics platform, a Nexio™ server, and an IconMaster™ master control switcher, all of which are sold by Harris Corporation (whose website is accessible at "www.harris.com")

As further shown in FIG. 1, broadcast system 102 also includes a automation system 104 connected to transmitter 106, to communication devices 114 via one or more networks, and to back office server 110. Automation system 104, in some embodiments, may include the Dynamic Content Scheduler™ and Interactivity Desk™ products available from Never.no of Oslo, Norway (whose website is accessible at "www.never.no").

Advantageously, automation system 104 is configured to control transmitter 106 (e.g., it may control when and what content is transmitted by transmitter 106) as well as certain aspects of the end user application (e.g., a video application or other application) running in communication devices 114. In some embodiments, automation system 104 controls these units by transmitting trigger messages that are received by the units (e.g., messages that cause the units to perform some pre-defined action based on information in the trigger message). In some embodiments, a schedule is used to control the timing of when the automation system 104 will send a trigger message. The schedule may also contribute to the content of the trigger message. In these embodiments, automation system 104 accesses one or more schedules 191, which may be stored in a storage device of a storage system 108 (which may include volatile memory units that may be shared by multiple processes or threads as well as non-volatile memory units). In some embodiments, the application running in a communication device 114 that is controlled by automation system 104 is an application that tunes to the interactive video channel (e.g., a video application).

Figure 2:
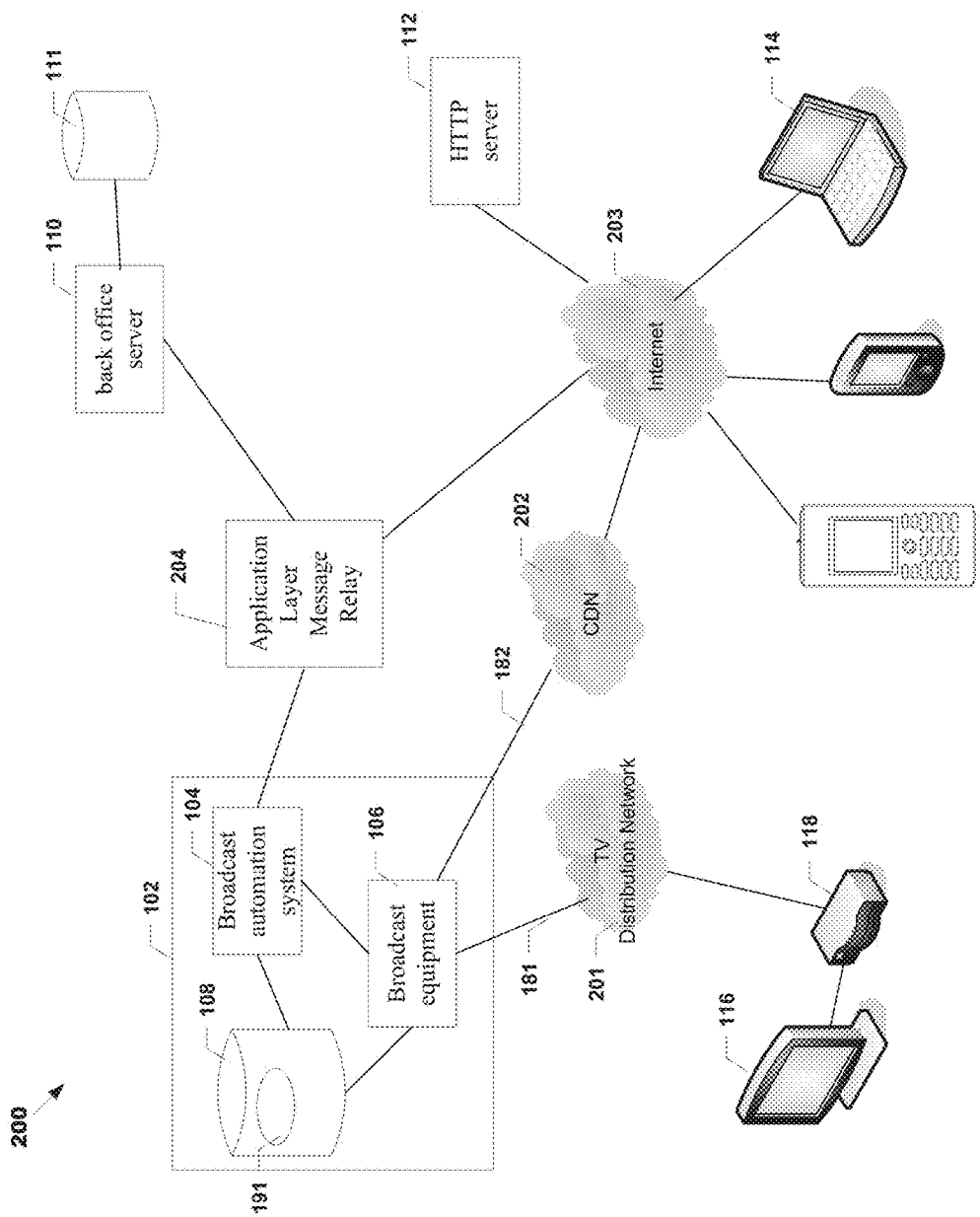
FIG. 2 illustrates an interactive, multi-platform video network according to another embodiment of the invention.

Referring now to FIG. 2, FIG. 2 illustrates one specific possible implementation of system 100. As shown in FIG. 2, transmitter 106 is connected to a TV distribution network 201 (e.g., satellite TV network, cable TV network, etc.) to which TV 116 is also connected. In the example shown TV 116 is connected to network 201 via STB 118, but this is not a requirement as some TVs have the capability of connecting to network 201 directly. As further shown, transmitter 106 is also connected to a content delivery network (CDN) 202, which is connected to the Internet 203, to which communication devices 114 are also connected. In the embodiment shown in FIG. 2, a user of communication device 114 tunes to the interactive video channel by transmitting a request (e.g., an HTTP GET request) to server 112, which responds by transmitting to the device 114 a certain application that, in some embodiments, may be configured to, among other things, automatically send a request to a server in CDN 202, which responds to the request by relaying stream 182 to the application.

As further shown in FIG. 2, system 200 may employ a message relay 204 for relaying application layer messages (e.g., the trigger messages discussed above). For instance, when automation system 104 is directed by schedule 191 to transmit a certain trigger message, automation system may simply provide the message to message relay 204 and then message relay 204 will retransmit the message (e.g., using a multicast transmission) so that it is received by server 110 and/or all the communication devices 114 that should receive the message. In some embodiments, message relay 204 implements a publish/subscribe model. In this model the sender of a message (e.g., automation system 104) does not need to know how many or the addresses of the receivers (e.g., communication devices 114, server 110), and the receivers do not need to have knowledge of the original sender. The message relay 204 is responsible for figuring out where messages should go. One common method of accomplishing this is to have the senders and receivers register with message relay 204.

Figure 3:
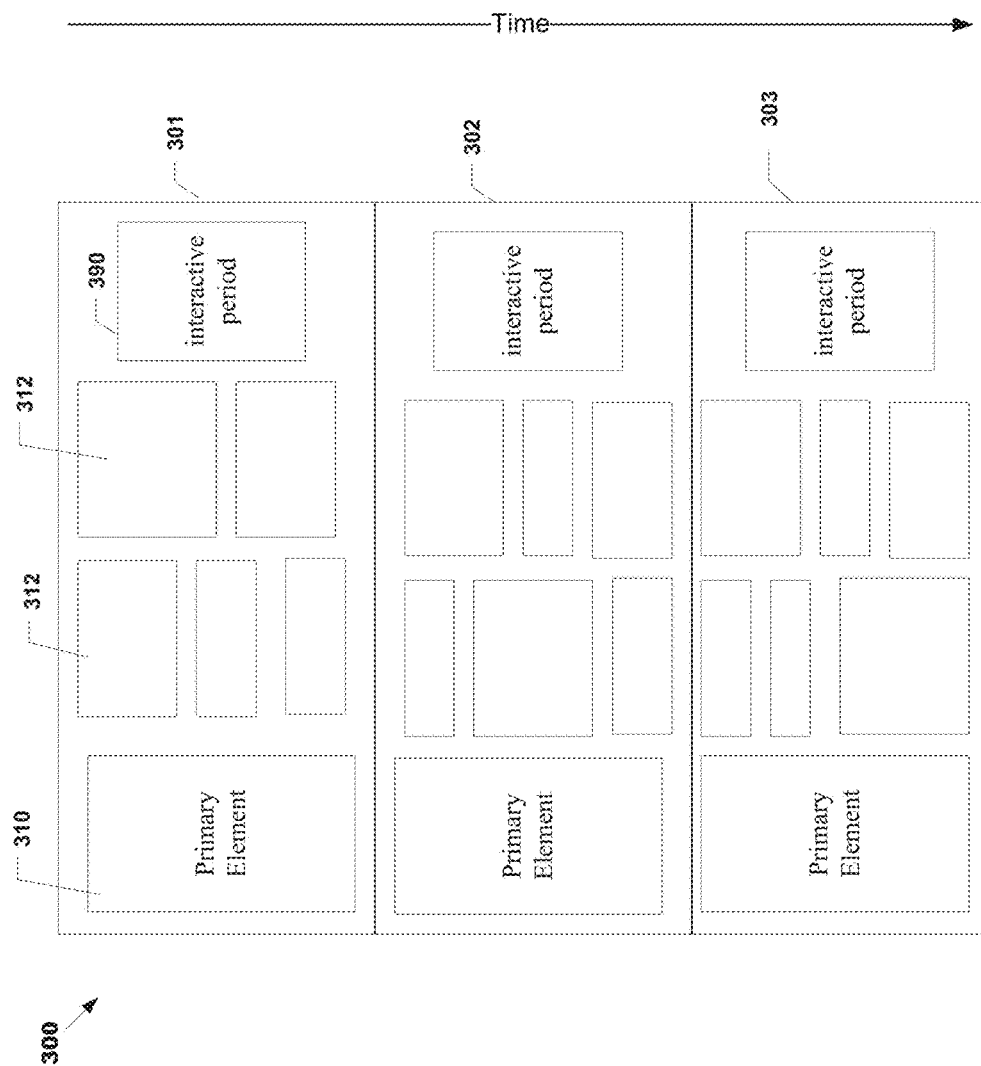
FIG. 3 illustrates components of an episode of an interactive show.

Referring now to FIG. 3, FIG. 3 is a block diagram for illustrating an example episode 300 of an example interactive, voting enabled, video program (e.g., interactive music video program) that is carried on the interactive video channel. Episode 300 has one or more chapters. In the example shown, episode 300 has three chapters (i.e., chapters 301, 302, 303). Each of these chapters includes a primary video element 310 (in this case a particular music video), a plurality of secondary video elements 312 (e.g., overlay elements or control functions, such as video squeeze backs, audio ducking, etc.). Each overlay secondary video element can convey, for example, any one or more of the following: (a) information about the interactive video channel (e.g., a logo associated with the channel), (b) information about the primary video element (e.g., the name of the artist, the title of the song, etc.), (c) information regarding an interactive feature of the show (e.g., information regarding the choices (e.g., music videos or artists) the viewers can select or information about a poll), (d) information about voting (e.g., the current vote tally), and (e) prompts to the viewers to submit their own content. Additionally, a control function secondary video element may have some affect on (a) the primary element (e.g., ducking or squeeze back of the primary element), (b) the broadcast signal (e.g. trigger for ad insertion downstream), or (c) external devices (e.g. communication devices 114 or back office servers 110).

The duration of the primary video element 310 is usually the duration or close to the duration of the chapter in which the primary element 310 falls. The duration of the secondary video elements may vary. Some secondary video elements (e.g., a channel identifier still image overlay) may have a duration as long as the chapter (or longer), while others (e.g., squeeze back) may have relatively short durations (e.g., 10 seconds). As shown in FIG. 3, each chapter of the example episode may have an interactive period 390 (e.g., a period of time during which a user may cast a vote for one of the available choices—typically a set of two or more titles or artists or interact in some other way) that usually begins shortly after the start of the primary video and usually ends shortly before the end of the primary element 310 (e.g., in the range of 1 to 60 seconds before the end of the primary video), but, in some embodiments where the next primary element 310 is a commercial, the interactive period 190 may continue after the end of the first primary element 310 so that, for example, voting may occur during the commercial break.

Figure 4:
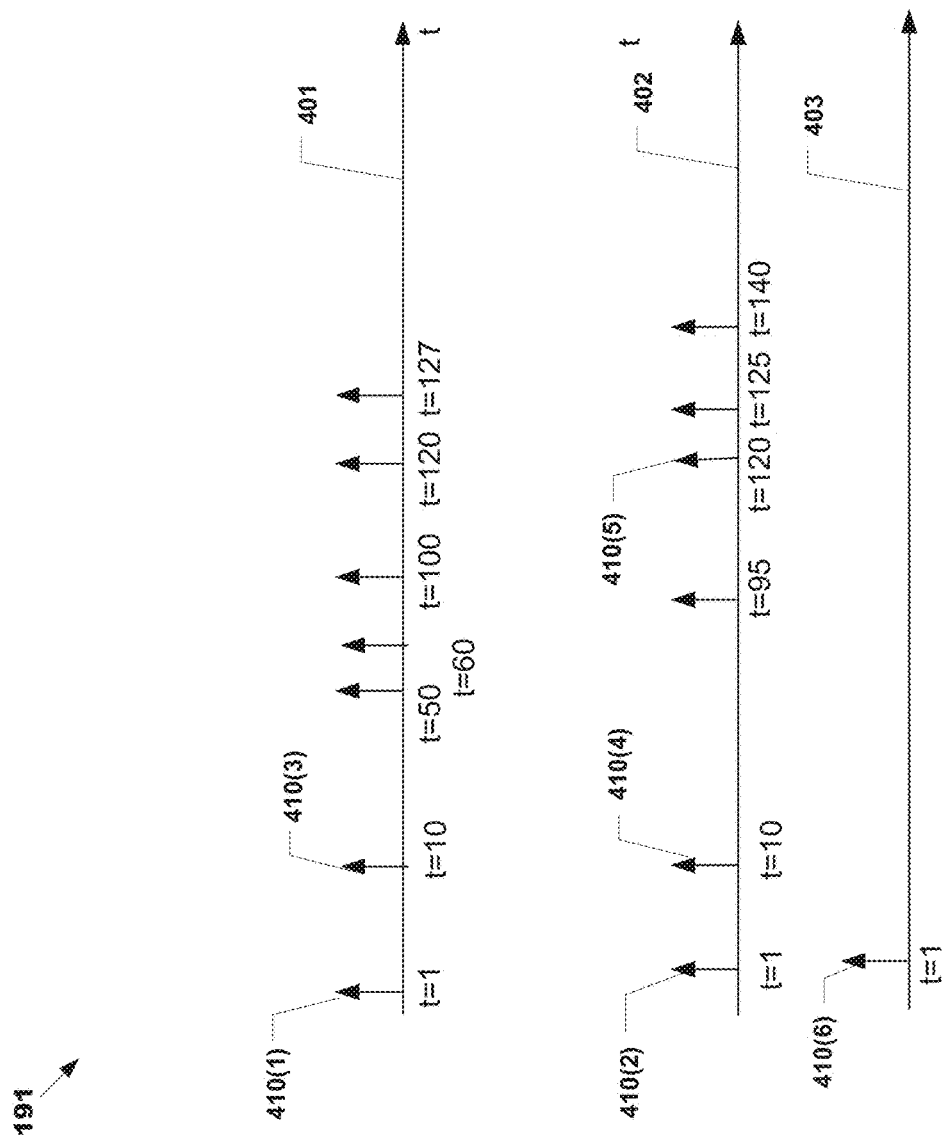
FIG. 4 represents a schedule for use by a automation system.
Figure 12:
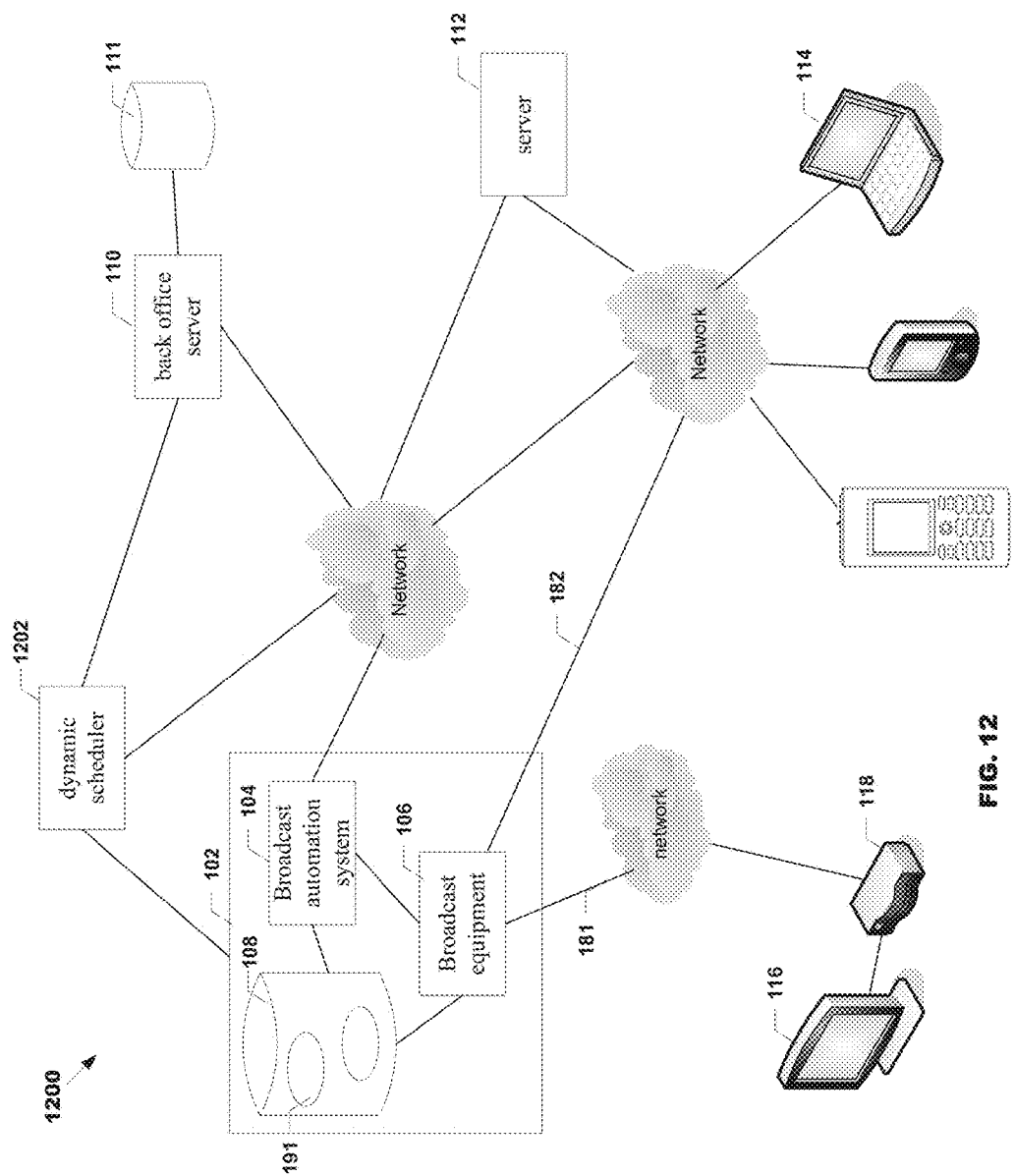
FIG. 12 illustrates an interactive, multi-platform video network according to another embodiment of the invention.

As discussed above, a schedule is used to control automation system 104 (e.g., control when system 104 will send a trigger message). A schedule may comprise a set of data objects, where each data object is associated with a particular point in time and may contain information that instructs automation system 104 to take one or more particular actions. Referring now to FIG. 4, FIG. 4 conceptually illustrates a schedule 191. In this example, schedule 191 is a schedule for a chapter of an episode of a show. In the example shown, schedule 191 includes three time lines: a time line 401 for transmitter 106, a time line 402 for external system (e.g., communication devices 114, back office server 110 and dynamic scheduler 1202, which is shown in FIG. 12), and a procedure time line 403. This is for illustrative purposes, as one of ordinary skill in the art would appreciate upon reading this disclosure that one time line is sufficient, but any number may be used.

Each time line 401, 402, 403 includes one or more triggers 410 (represented by the upward arrows) and each trigger is located at a specific point on the time line, which represents a specific point in time (e.g., an absolute time or a relative time), and is, or is associated with, a data object. When the specific point in time at which a trigger is located is reached, the automation system will take an action based on information associated with the trigger. In the example shown, trigger 410(1) is a "video start" trigger. Associated with this trigger may be a unique video identifier identifying a particular video file containing a particular video. In some embodiments, each trigger on line 401 is associated with either a primary element 310 or a secondary element 312, each trigger on line 402 is associated with a control function secondary element 312, and each trigger on line 403 is associated with a procedure (e.g., some computer code that is designed to perform a certain task).

When trigger 410(1) is reached (i.e., when the current time matches the time at which trigger 410(1) is located), automation system 104 may transmit to transmitter a "video start" trigger message, which may include the unique video identifier. In response, transmitter 106 may use the video identifier to retrieve from storage 108 the identified video file, queue the file for transmission, and then produce and transmit streams 181, 182 such that the streams contain the contents of the file (e.g., an encoded variant thereof). Trigger 401(2), in this example, is also a "video start" trigger. When trigger 410(2) is reached, automation system 104 may transmit (directly or indirectly) a "video start" trigger message, which may include the unique video identifier, to communication devices 114 and to server 110 via, for example, application layer messaging relay 204. Trigger 401(6), in this example, is configured such that when procedure trigger 401(6) is reached, a particular procedure (e.g., software module) is activated. The particular procedure may be a procedure that, when activated, monitors, for example, a count (e.g., a vote count) and then takes some action when the count reaches or exceeds a threshold. The action that the procedure takes may be transmitting a message to equipment 106 that causes it to add/remove an overlay from video stream 181/182, transmitting a message to devices 114, and/or adding triggers to time line 401 and/or 402.

The other triggers shown on time line 401 are related to the secondary elements of the chapter. For example, trigger 410(3) may cause automation system 104 to send a trigger message to equipment 106 that causes equipment 106 to add to video stream 181 an overlay element (e.g., a still image, an animation, a video) that informs the user that the user may submit a vote for the next video to play. The other triggers on time line 402 (i.e., triggers 410(4) and 410(5)) cause automations system 104 to send to the communication devices 114 and server 110 a "vote start" message and a "vote end" message, respectively.

Figure 5:
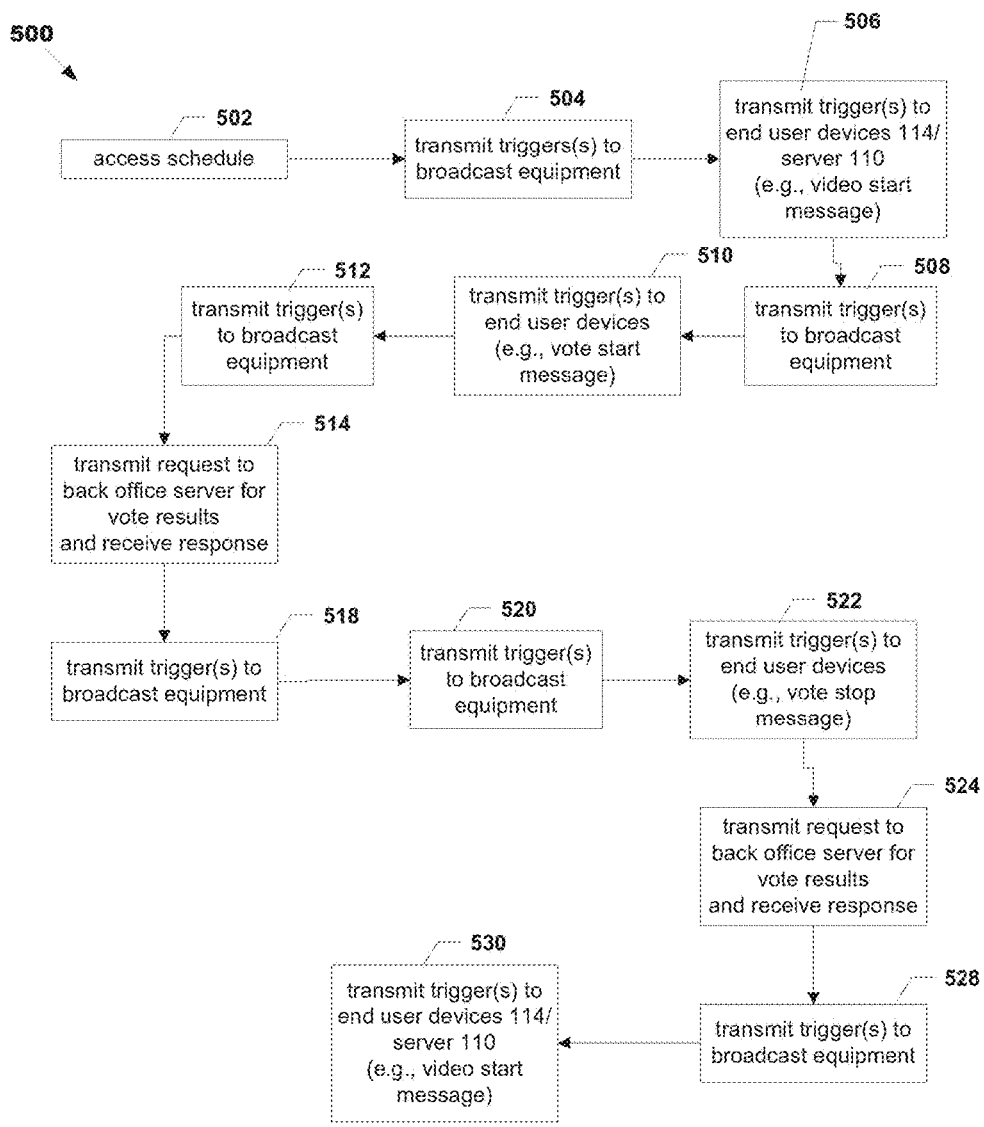
FIG. 5 is a flow chart illustrating a process, according to an embodiment, that is performed by a automation system.

Referring now to FIG. 5, FIG. 5 is a flow chart illustrating an example process 500 that is preformed by automation system 104 as a result of the schedule shown in FIG. 4. Process 500 starts at step 502, where automation system 104 accesses schedule 191 shown in FIG. 4 and performs actions as instructed by the schedule. That is, at time t=1, automation system 104 transmits video start message 601 (see the message flow diagram shown FIG. 6) to equipment 106 (step 504), transmits video start message 602 to devices 114 and server 110, respectively (step 506), and activates a software module based on the trigger. At time t=10, automation system 104 transmits to equipment 106 a trigger message 603 related to a secondary element (step 508) and transmits vote start message 604 to devices 114 and server 110, respectively (step 510). At time t=50, automation system 104 transmits to equipment 106 a trigger message 608 related to a secondary element (step 512). Message 608 may cause equipment to overlay an overlay element. At time t=60, automation system 104 transmits to equipment 106 another trigger message 609 related to the secondary element. Message 609 may cause equipment to stop the overlay of the overlay element. At time t=95, automation system 104 transmits to back office server 110 a request message 610 requesting the current voting results and receives a response message 612 containing the voting results (step 514). At time t=100 (step 518), automation system 104 transmits to equipment 106 a trigger message 614 that causes equipment 106 to add to video stream 181 information identifying the current vote tally (e.g., candidate video A has received 45% of the votes and candidate video B has received 55%) so that a viewer using TV 116 to view the channel can see the voting results in real time. At time t=120 automation system 104 transmits to equipment 106 a trigger message 615 related to a secondary element (step 520) and transmits vote stop message 616 to devices 114 and server 110, respectively (step 522). At time t=125, automation system 104 transmits to back office server 110 a request message 618 requesting the final voting results and receives a response message 620 containing the voting results (step 524). Next (step 528), automation system 104 transmits to equipment 106 a trigger message 622 that causes equipment 106 to add to video stream 181 an overlay containing information identifying the vote winner so that a viewer using TV 116 to view the channel can see the voting result. Next (step 530), automations system 104 transmits a video stop message 624 to devices 114 and server 110.

Figure 6:
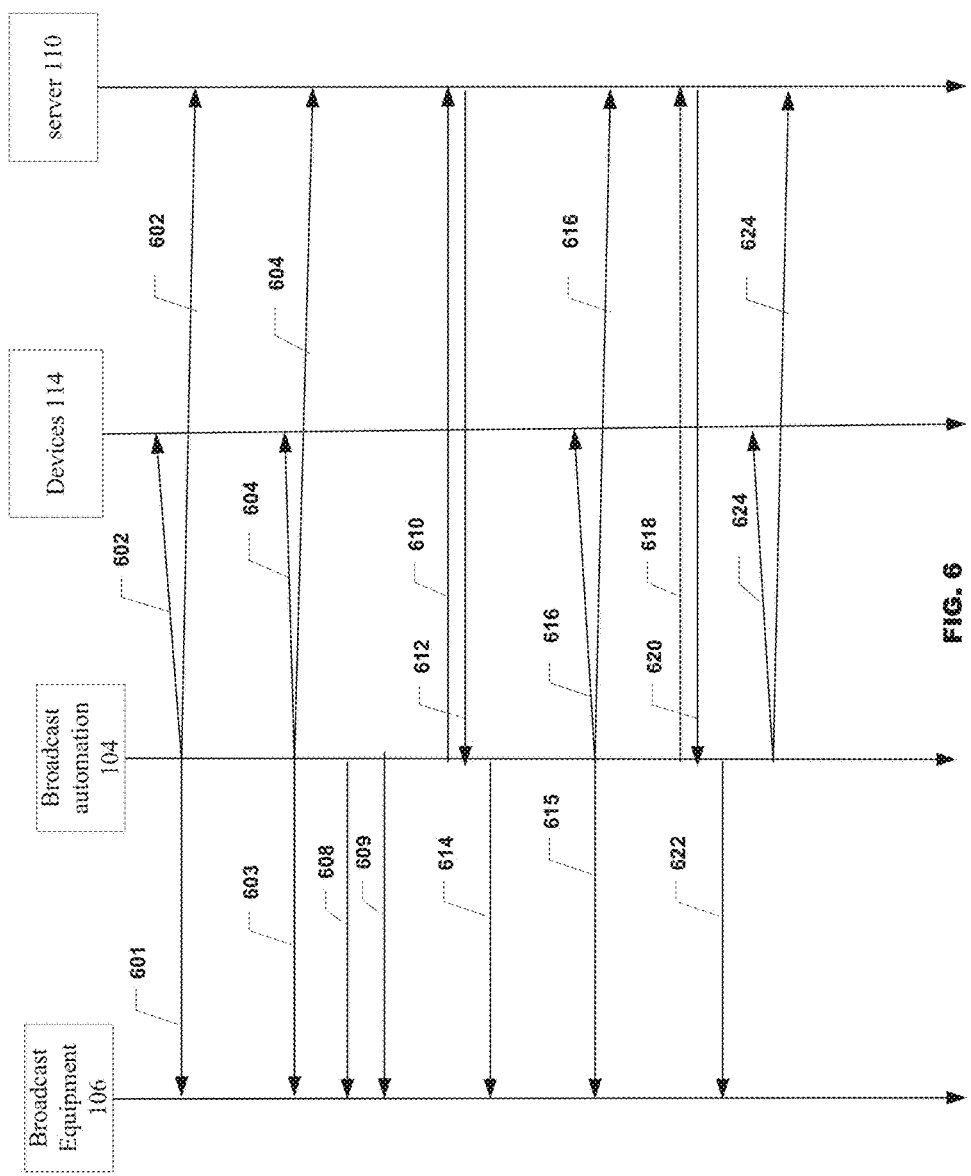
FIG. 6 is a message flow diagram showing an example message flow.

As indicated in FIG. 6, vote stop message 616 preferably is transmitted prior to the point in time at which the currently playing video ends (e.g., between 1 and 60 seconds before the end of the video) This is done so that the winner of the vote can be determined and displayed to the end users prior to the end of the currently playing video. If what is being voted on is the next video that will play, it is, in some embodiments, important that the winning video be known prior to the end of the current video so that there is no (or only a small amount of) dead time between the current video ending and a new video playing.

Figure 7:
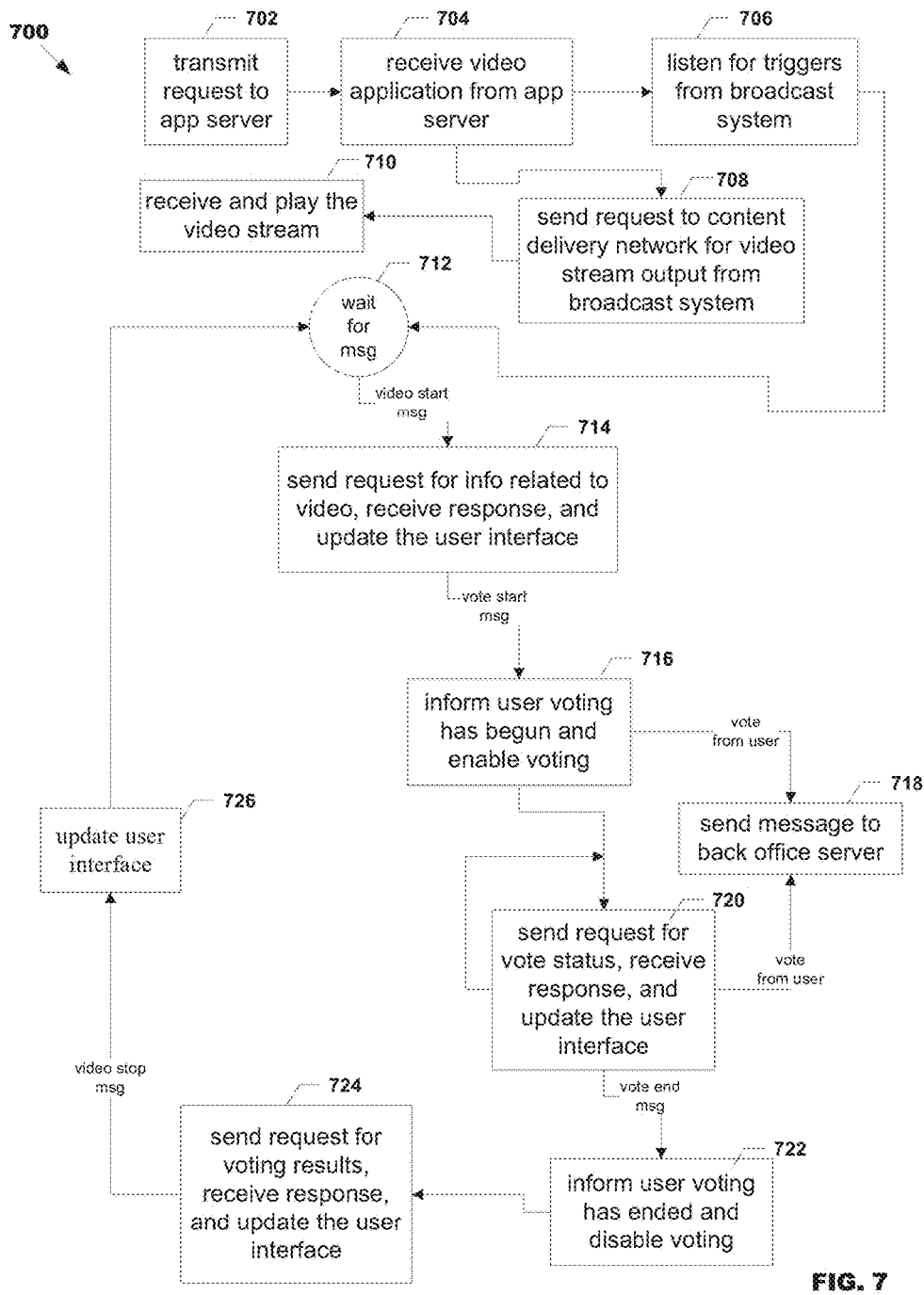
FIG. 7 is a flow chart illustrating a process, according to an embodiment, that is performed by a communication device.

Referring now to FIG. 7, FIG. 7 is a flow chart illustrating a process 700 performed by a device 114. Process 700 may begin in step 702 where device 114 transmits to sever 112 a request message 802 (see the data flow diagram shown in FIG. 8) (e.g., an HTTP GET request). In response, device 114 receives from the server an application 804 (step 704). In some embodiments, the application consists of an HTML file transmitted to device 114 in response to the request message 802 plus all of the objects (e.g., javascript code, flash objects, java applets, etc.) that the HTML file causes device 114 to download.

Figure 8:
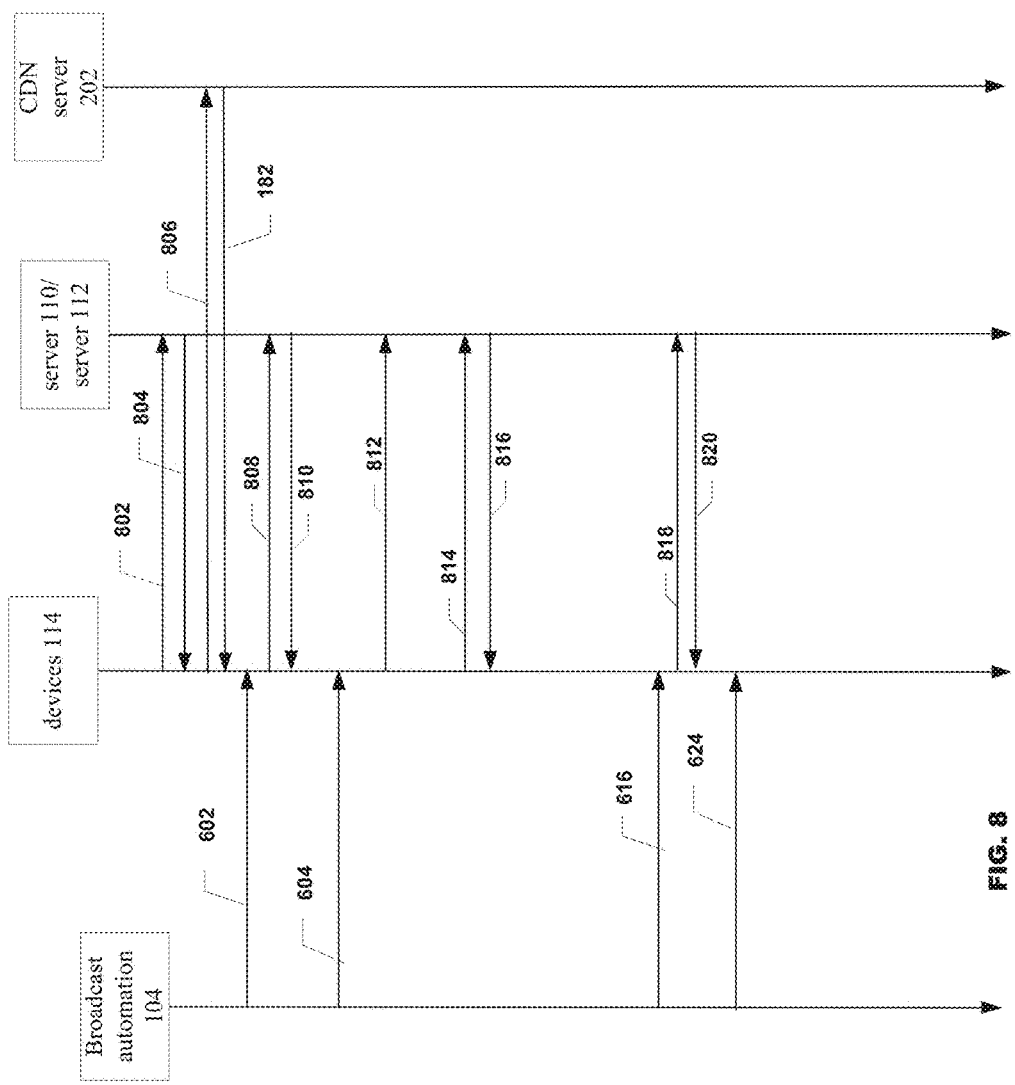
FIG. 8 is a message flow diagram showing an example message flow.

In step 706, the application listens for trigger messages from automation system 104. For example, in step 706, the application may register with message relay 204 and subscribe to messages sent by automation system 104, or it may simply listen for and accept messages addressed to a certain address or port (as depicted in FIG. 8).

In step 708, the application generates and displays on a display of device 114 a user interface and may transmit to a sever of CDN 202 a request 806 for the video stream 182 output by broadcast system 102. In step 710, the application receives and plays the video stream (e.g., it displays in a window of the user interface the video encoded in stream 182). While step 710 is occurring, the other steps of process 700 may proceed in parallel.

In step 712, application waits for one or more trigger message(s) from automation system 104. For the sake of simplicity, we will assume that application performed step 712 immediately prior to automation system transmitting video start trigger message 602 so that the first message received by application is message 602. In response to receiving the video start trigger message 602, the application sends to a server (e.g., server 110/112) a request 808 for information associated with the video identified in the video start trigger message, receives the information 810, and updates the user interface so as to include information received from the server (e.g., the information may include title information, artist information, trivia regarding the video, etc) (step 714).

In response to receiving vote start trigger message 604 from automation system 104, the application updates the user interface to inform the user that the user may vote for a candidate (e.g., a candidate music video) (step 716). After step 716, application will perform step 718 in response to the user voting and may periodically perform step 720. In step 718, the application sends a message 812 to server 110. Message 810 contains information indicating the candidate for which the viewer voted. In step 720, the application sends to server 110 a request message 814 requesting the current vote tally, receive a response message 816 indicating the current vote tally, and updates the user interface to reflect the current vote tally. Steps 722, 724 will be performed in response to the application receiving a vote stop message 616. In step 722, the application updates the user interface to inform the user that voting has ended and disables voting. In step 724, the application sends to server 110 a request message 818 requesting the final vote tally, receive a response message 820 containing the final vote tally, and updates the user interface to inform the user of the final vote tally. After step 724, the application will perform step 726 in response to receiving a video stop trigger message 624. In step 726, the application may update the user interface to indicate that the video that was playing has ended.

Figure 9:
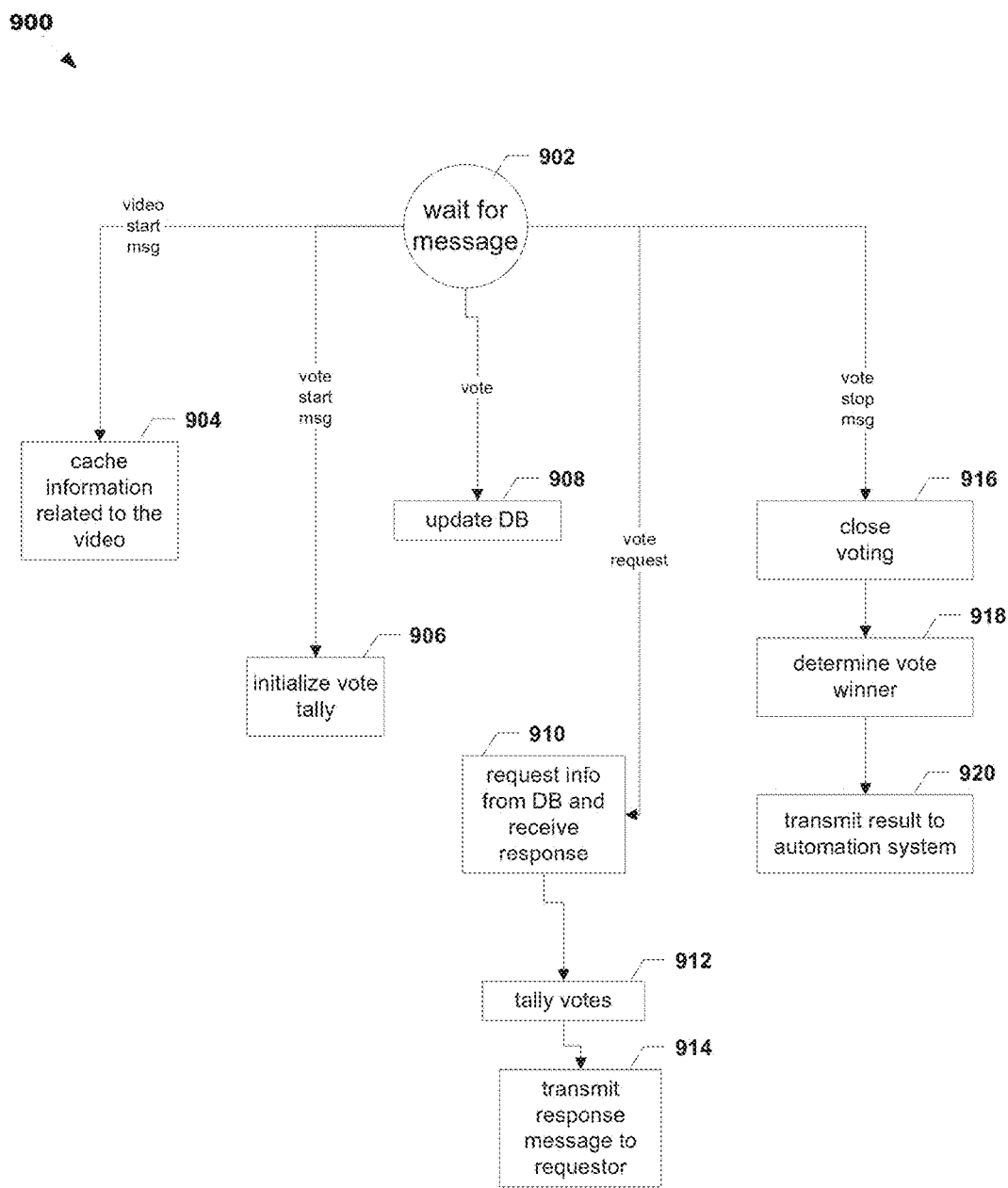
FIG. 9 is a flow chart illustrating a process, according to an embodiment, that is performed by a back office server.
Figure 10:
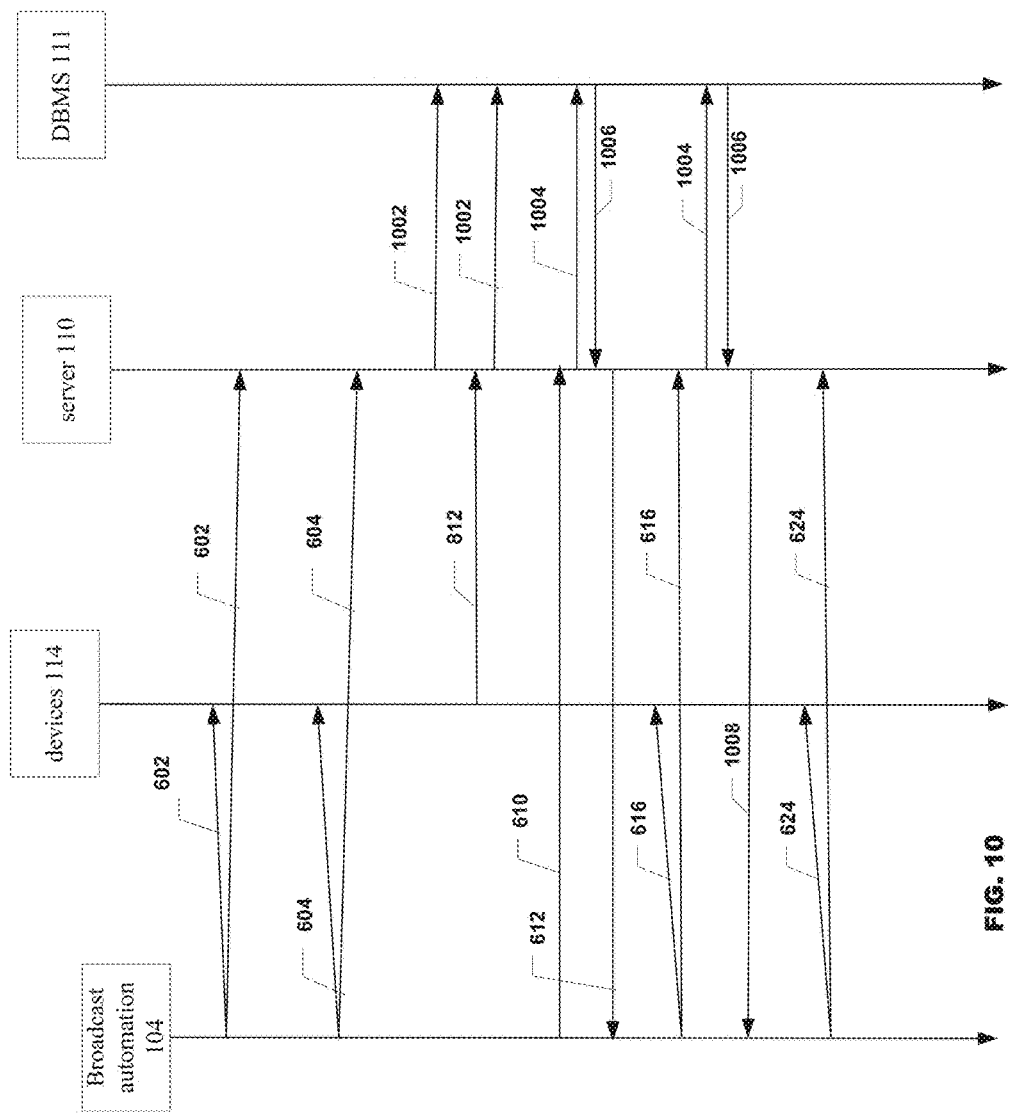
FIG. 10 is a message flow diagram showing an example message flow.

Referring now to FIG. 9, FIG. 9 is a flow chart illustrating a process 900 performed by server 110. Process 900 may begin in step 902, where server 110 waits for a message. In response to a video start message 602, server 110 performs step 904. In step 904, server 110 may copy into a data store (e.g., a cache) information associated with the video identified in the message. For example, in step 904, server 110 may push the information to servers 112, which will then store the information locally. This is done because a device 114 that receives message 602 may send to server 110/112 a request for the information and the information can be provided more quickly to device 114 if the information is cached.

In response to a vote start message 604, server 110 performs step 906. In step 906, server 110 initializes a vote (e.g., initializes and/or creates resources—such as database resources (message 1001)—for storing voting information).

In response to a vote message 812, server 110 performs step 908. In step 908, server 110 updates the database 111 to reflect the vote. For example, server 110 may use one database record for recording votes for one candidate and another database record for recording votes for another candidate, and in step 908 server 110 will update the appropriate record by transmitting an update message 1002 to database 111.

In response to a vote request message 610/818, server 110 performs steps 910-914. In steps 910-914, server 110 will request vote information from the database (e.g., submit query 1004 to database 111), receive from the database a response 1006 that may include the total number of votes received for each candidate, tally the current vote count, and transmit to the requestor a response message 612/820 (see FIG. 6) containing the computed vote tally.

In response to a vote stop message 616, server 110 performs steps 916-920. In steps 916-920, server 110 closes the polls (e.g., does not accept any more votes), sends a query 1004 to the database, receives the response 1006, determines the vote winner based on information in the response 1006, and, in some embodiments, transmits to automation system 104 a message 1008 that identifies the winner.

Figure 11:
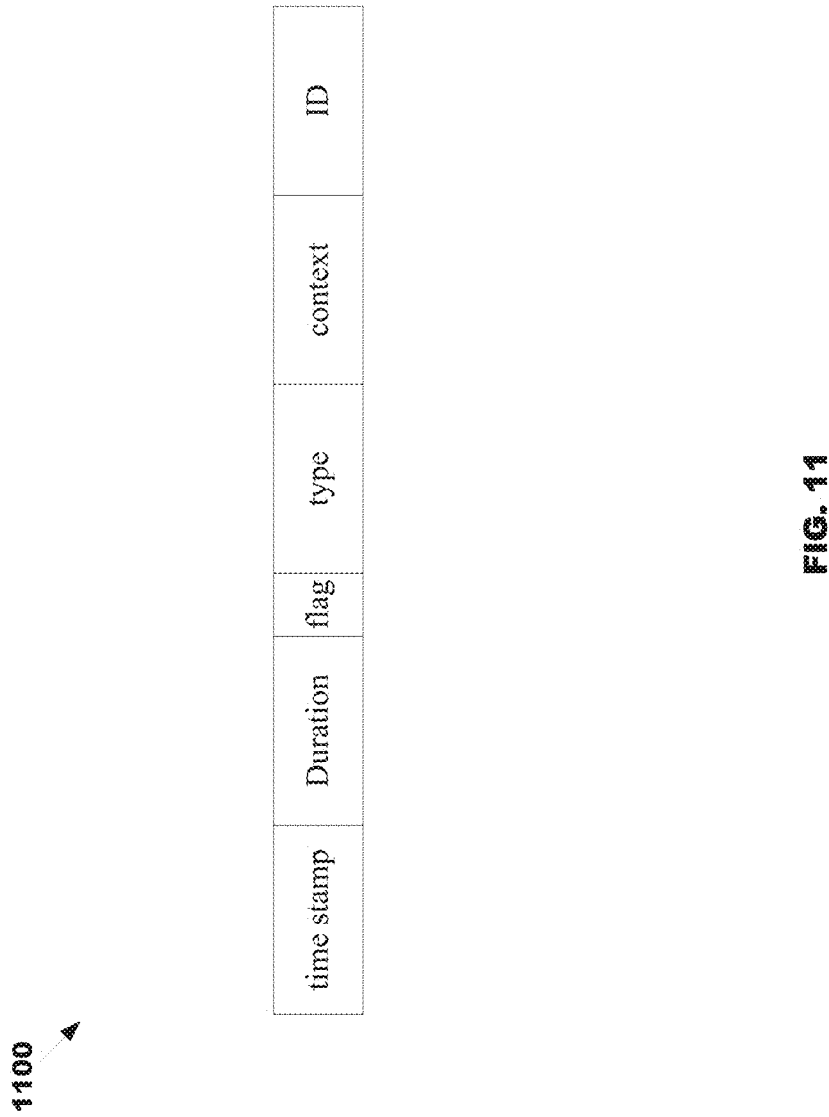
FIG. 11 illustrates an example trigger message format.

Referring now to FIG. 11, FIG. 11 illustrates an example trigger message format 1100. In the example shown, the trigger messages sent by automaton system 104 to devices 114 and server 110 may include the following fields: time stamp; type; context; identifier; duration; and flag. The time stamp field may contain information indicating the time the message was created and/or sent. The type field specifies the type of message. In some embodiments, the following types are available: start, stop, hide, resume, hibernating, awakening. The context field contains information identifying a context. In some embodiments, the following contents are defined: episode, chapter, video, game, and vote. The ID field contains an identifier that uniquely identifies an instance of the specified context. For example, if the context is "video" then the ID field may contain an identifier identifying a particular video. The duration field may contain information indicating the duration of the identified instance of the identified context. So, for example, if the context is "video" and the ID is XYZ, then the duration field may contain information identifying the duration of the XYZ video. The flag field may be used to indicate whether the information in the duration field identifies a fixed duration or an estimated duration. For example, chapters may have estimated durations. Thus, if the context is set to "chapter," then the duration field my identifier an estimated duration of the chapter.

As discussed above, the trigger messages sent by automation system 104 to devices 114 and server 110, typically cause the receiver of the trigger message to perform some action based on the information contained in the trigger message. For example, a trigger message with type=hide and context=video, may cause the receiver to hide the currently playing video. As another example, a trigger message with type=hibernating and context=episode may be sent when the episode is interrupted by a commercial break and may cause the receiver to change the user interface it controls to indicate the break in the episode by, for example, removing some information from the interface or adding a message to the interface.

Dynamic Scheduling

Some of the programs broadcast on the interactive video channel are programs that allow viewers to control the content of the program. For example, one program allows viewers to cast a vote indicating that the viewer wants the channel to play a different video than the one currently being played. If enough such votes are casts, the video stops playing and a new one begins right away. As another example, some of the programs broadcast on the interactive video channel are programs that allow viewers to control which video will be played next (i.e., in the immediately following chapter) by allowing the viewers to vote for their favorite video from a set of two or more candidate videos. That is, for example, while one video is playing (i.e., while one chapter of the episode is on air), the viewers may select which video will play next by voting for the next video while the current video is being broadcast. This presents a scheduling challenge because, as discussed above, a chapter of an episode includes not only the primary element (e.g., the selected video) but also a plurality of secondary elements (see FIG. 3), some of which may contain information related to the primary element. Because users ultimately choose the next primary element, it is impossible to know a priori which primary elements will be broadcast during any particular episode of the show.

To overcome this problem, systems according to embodiments of the present invention employ a dynamic scheduler 1202 (see FIG. 12), which may or may not be used in conjunction with the cross-platform application control features described above. While FIG. 12 shows dynamic scheduler 1202 being separate from broadcast system 102 and back office server 110, this is not a requirement, as dynamic scheduler 1202 may be a component of broadcast system 102 and/or back office server 110. For example, dynamic scheduler 1202 may be a procedure that is activated by a trigger associated with time line 403.

In some embodiments, dynamic scheduler 1202 functions to create, on-the-fly, components of a schedule 191 for an episode. That is, dynamic scheduler 1202 may function to create at least parts of a schedule for an episode while a portion of the episode (e.g., a chapter of the episode) is being broadcast (i.e., is live). More specifically, in some embodiments, while one chapter of an episode is being broadcast, dynamic scheduler 1202 may create a schedule for the immediately following chapter or chapters and/or modify the schedule for the live chapter.

Figure 13:
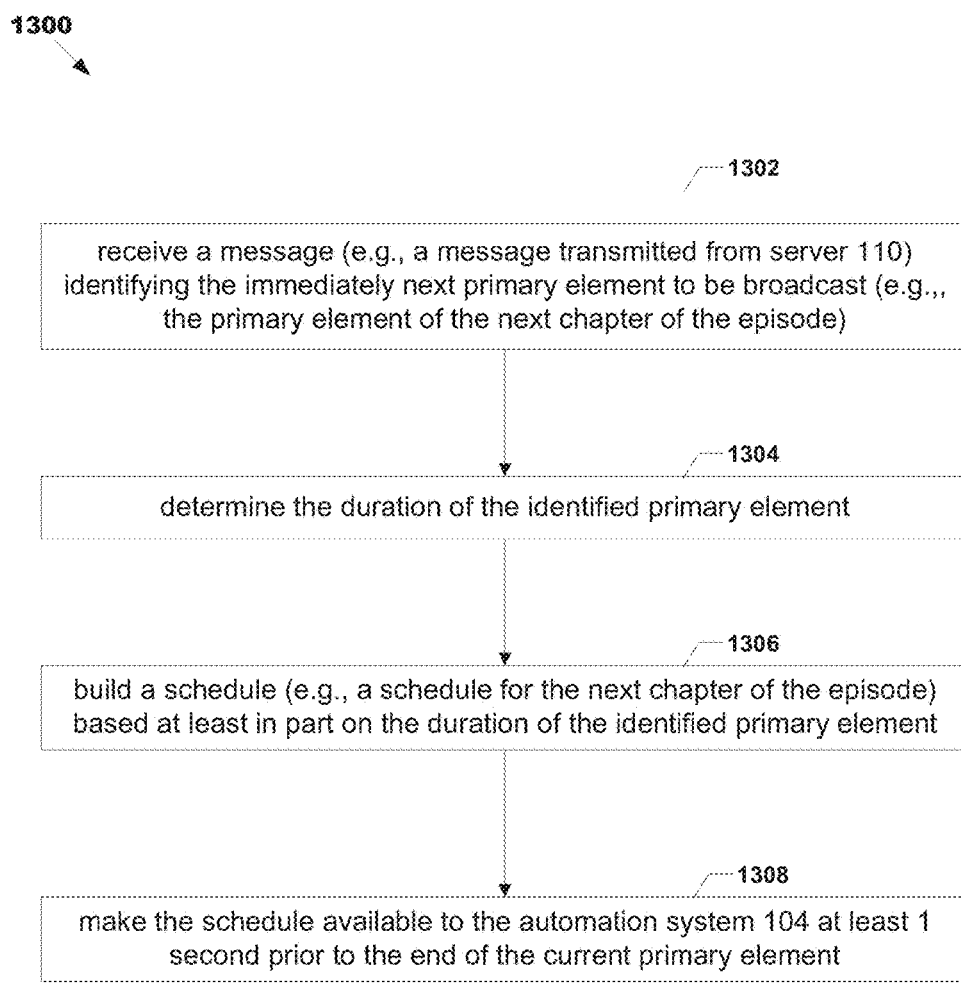
FIG. 13 is a flow chart illustrating a process, according to an embodiment of the invention, that is performed by a dynamic scheduler.

Referring now to FIG. 13, FIG. 13 illustrates a process 1300, according to some embodiments, that is performed by dynamic scheduler 1202 in response to dynamic scheduler 1202 receiving a "vote stop" message from automation system 104. Process 1300 may be performed while broadcast system 102 is broadcasting a primary element (i.e., the "current primary element"). In step 1302, the scheduler receives an indication (e.g., a message transmitted from server 110) identifying the immediately next primary element to be broadcast (e.g., the primary element of the next chapter of the episode). In step 1304, the scheduler determines the duration of the identified primary element. In step 1306, the scheduler creates a schedule (e.g., a schedule for the next chapter of the episode) based at least in part on the duration of the identified primary element. In step 1308, the scheduler creates the schedule available to the automation system 104 (e.g., the schedule is made available at least 1 second prior to the end of the current primary element).

Figure 14:
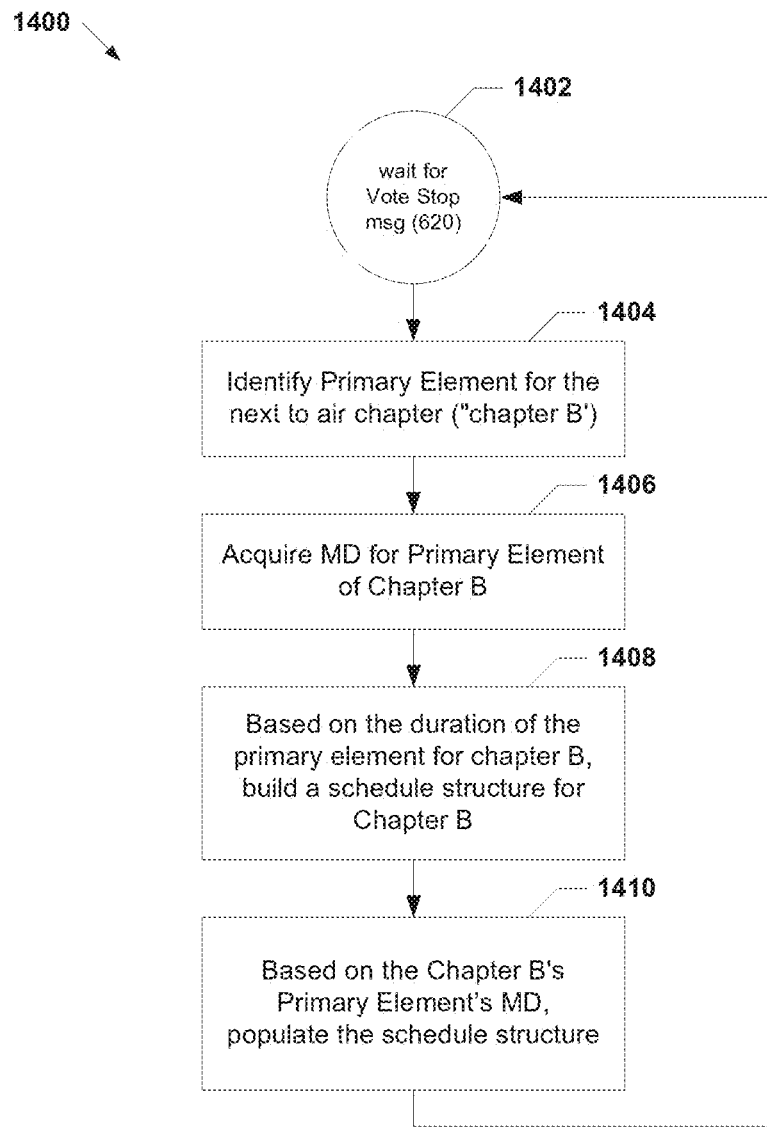
FIG. 14 is a flow chart illustrating a process, according to an embodiment of the invention.
Figure 15:
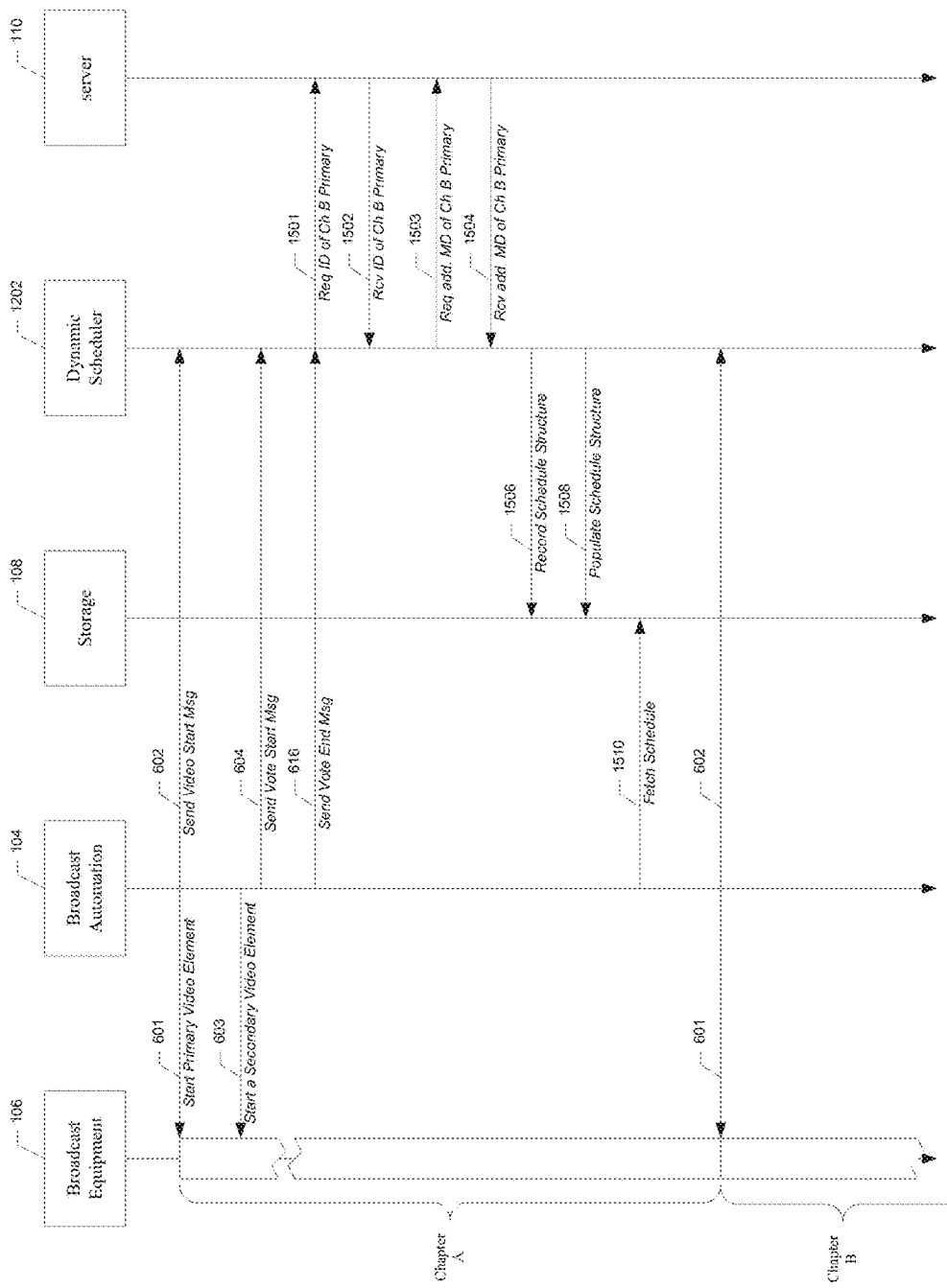
FIG. 15 is a data flow diagram illustrating an example data flow.

Referring now to FIG. 14, FIG. 14 illustrates a process 1400, according to some embodiments, that is performed by dynamic scheduler 1202. Process 1400 may be performed while broadcast system 102 is broadcasting a primary element (i.e., the "current primary element") of a chapter ("chapter A"). In step 1402, the scheduler waits for a "vote stop" message from automation system 104. When one is received, process 1400 proceeds to step 1404. In step 1404, the scheduler identifies the primary element for the next chapter to air ("chapter B"). This may occur by transmitting a request message 1501 (see the data flow diagram shown in FIG. 15) to server 110 and receiving a response message 1502 containing an identifier identifying the primary element. Next, in step 1406, the scheduler acquires meta data (MD) for the primary element of chapter B. This may occur by transmitting to server 110 a request message 1503 containing the received identifier and receiving a response message 1504 containing the requested MD. Next, in step 1408, the scheduler, based on the duration of the primary element for chapter B, which duration may be determined from the MD, builds a schedule structure for chapter B and records the structure in a unit of storage 108 (see message 1506). In this embodiment, the unit of storage 108 may be a shared memory. For example, creating a schedule structure may consist of associating "empty" triggers with points in time, where an "empty" trigger is a trigger that is missing some required data. As an example, an empty "video start" trigger would be a "video start" trigger that is not associated with any video identifier. Storing the schedule structure may consist of storing data representing the empty triggers. Next, in step 1410, the scheduler, based on the MD acquired in step 1406, populates the schedule structure (e.g., associates required data with the empty triggers) (see message 1508). After step 1410, a schedule is created.

Figure 16:
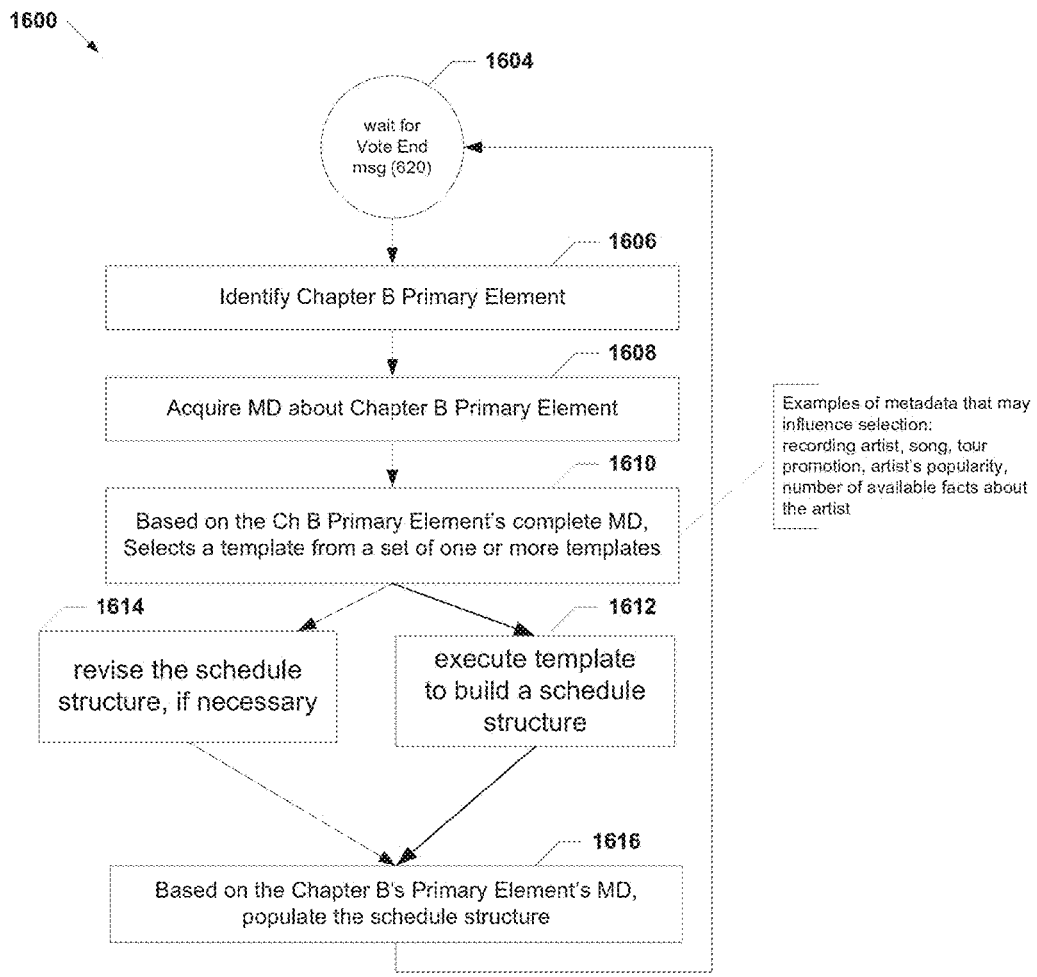
FIG. 16 is a flow chart illustrating a process, according to an embodiment of the invention.

Referring now to FIG. 16, FIG. 16 illustrates a process 1600, according to some embodiments, that is performed by dynamic scheduler 1202. Process 1600 may be performed while broadcast system 102 is broadcasting a primary element (i.e., the "current primary element") of a chapter ("chapter A"). In step 1604, the scheduler waits for a "vote stop" message from automation system 104. When one is received, process 1600 proceeds to step 1606. In step 1606, the scheduler identifies the primary element for the next chapter to air ("chapter B"). Next, in step 1608, the scheduler acquires meta data (MD) for the primary element of chapter B. Next, in step 1610, the scheduler, based on the chapter B primary element's MD, select a template from a set of one or more templates. As used herein a template may be a schedule structure or a set of rules for creating a schedule structure. If in the selected template is a set of rules for creating a schedule structure, then the process proceeds to step 1612, otherwise it proceeds to step 1614. In step 1612, the scheduler uses the set of rules and possibly other information (e.g., information regarding the primary element, such as its MD) to create a schedule structure appropriate for the primary element. In step 1614, the scheduler may revise the selected schedule structure (e.g., it may add one or more triggers (e.g., empty triggers or non-empty triggers) to the structure, remove one or more triggers from the structure and/or move in time one or more triggers associated with the structure (e.g., change the point in time with which the trigger is associated) based on the MD of the primary element for chapter B. Next, in step 1616, the scheduler, based on the chapter B primary element's MD, populates the schedule structure.

The fact that schedules 191 can be dynamic enables show creators to create new and interesting shows that have not been seen before. One such show is a contestant elimination show. An episode of the show works as follows: a planned schedule is created for the episode (usually before the episode airs). Typically, the primary element of the first chapter of the episode (i.e., Chapter A) is a music video. While Chapter A is airing (i.e., the music video scheduled in Chapter A is playing), the viewers may vote for the video or they may vote for aliens to destroy the video. If after some point during chapter A, the aliens have at least X % of the vote (e.g., at least 51% of the votes), then the video is "destroyed"—that is, chapter A terminates early and chapter B substantially immediately begins to air such that the music video scheduled in chapter B airs. It is the scheduler's 1202 ability to dynamically create/modify schedules that enables this to happen.

Figure 17:
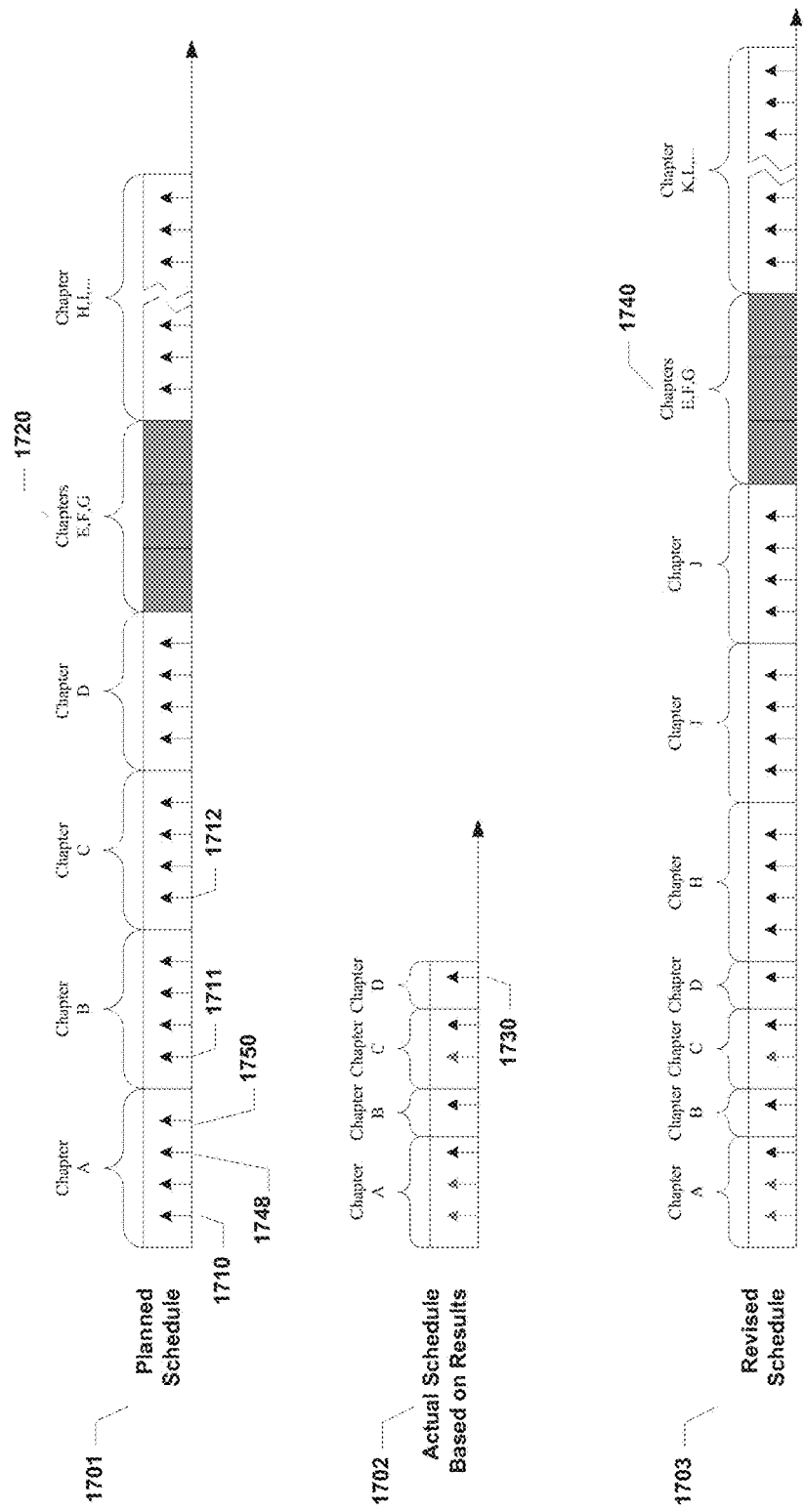
FIG. 17 illustrates example schedules.

Referring now to FIG. 17, FIG. 17 illustrates an example planned schedule 1701 for an episode of the elimination show, which schedule 1701 may be modified by the dynamic scheduler 1202 based upon the results of viewer interaction (e.g., viewer voting). In the example shown, planned schedule 1701 contains a sequence of chapters A, B, C, etc. Chapters E, F, and G 1720 are a sequence of breaks in the episode for television commercials to be played out. Chapters A,B,C,D,H, and I contain secondary programmable events (see, e.g., triggers 1710, 1711, and 1712). When these triggers occur, automation system 104 activates a procedure for determining whether the active chapter should be terminated before it finishes. In one example, automation system activates the procedure by transmitting a predetermined message to scheduler 1202, which, in response to the message, activates a component procedure of scheduler 1202. This procedure may be configured to monitor the vote tally to determine whether the aliens have won, and, if so, the procedure may be configured to: (1) add a trigger that to the schedule at about the current point in time so that a special animation overlay will be added to signal 181/182 indicating that the video will soon terminate, (2) move up in time the video stop trigger 1750 (and/or other triggers) in chapter A so that the video will terminate early, (3) remove triggers (e.g., trigger 1748) from chapter A and (4) shift all of the planned triggers for the remaining chapters back in time so that they will be reached earlier than originally planned.

The middle timeline 1702 shows how the planned schedule 1701 has run based on user interactions that have terminated the chapters A, B, C, and D earlier than originally planned. As shown in schedule 1702, chapter D includes a procedure trigger 1730. When this trigger is reached, automation system 104 may send to scheduler 1202 a message that causes scheduler 1202 to construct a revised schedule 1703. As shown in FIG. 17, in constructing the revised schedule, dynamic scheduler 1202 may reschedule the commercial breaks (e.g., Chapters E, F, and G in this example) to a new position 1740 in the episode so that the viewers won't see television commercials too frequently.

Figure 18:
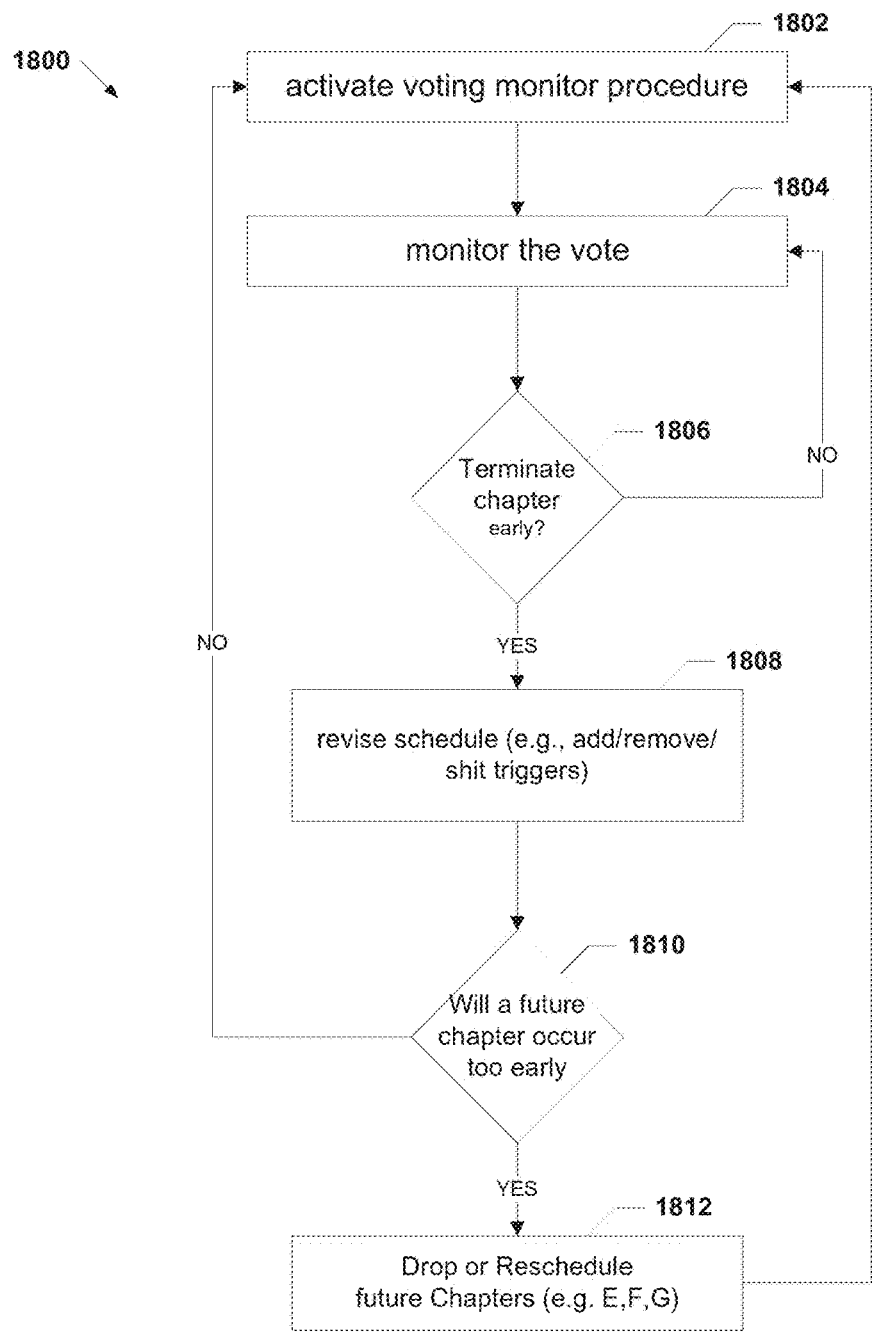
FIG. 18 is a flow chart illustrating a process, according to an embodiment of the invention.
Figure 19:
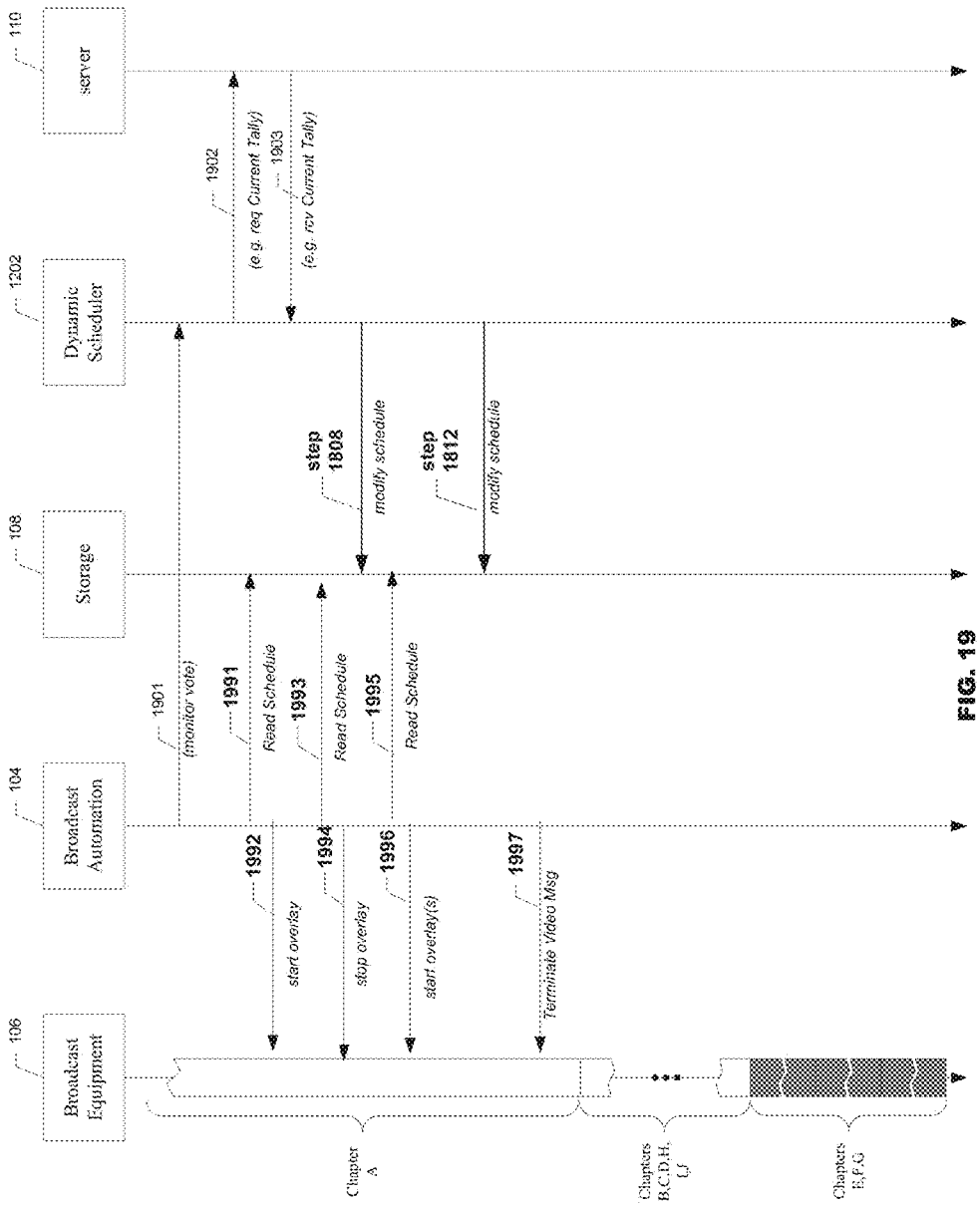
FIG. 19 is a data flow diagram illustrating an example data flow.

Referring now to FIG. 18, FIG. 18 is a flow chart illustrating a process 1800 according to an embodiment of the invention. Process 1800 occurs while the broadcast system 102 is broadcasting a primary event (e.g., the video scheduled for chapter A). Process 1800 may begin in step 1802, where automation system 104, in response to a procedure trigger, activates a voting monitor procedure (e.g., system 104 transmits a monitor vote message 1901 to scheduler 1202). In response to message 1901, a dynamic scheduler procedure will monitor the vote (step 1804) (e.g., by transmitting a request current tally message 1902 to server 110 and receiving in response a current tally message 1903 containing the current vote tally). In step 1806, a determination is made based on the vote tally whether the currently playing chapter should be terminated early. If not, the process proceeds back to step 1804, otherwise it proceeds to step 1808. In step 1808, scheduler 1202 may add, remove and/or shift triggers on the current schedule as discussed above with reference to FIG. 17. In step 1810, scheduler determines if any future chapters will occur too soon. If so, scheduler 1202 may drop or reschedule affected future chapters (step 1812). All the while process 1800 is occurring, automation system 104 continues to read the schedule and take actions based on the triggers in the schedule (this is illustrated in FIG. 19 by the arrows labeled 1991-1997). Thus, in some embodiments, it is advantageous that the schedule be stored in a memory unit (e.g., a random-access memory unit) of storage system 108 that can be accessed substantially simultaneously by automation system 104 and scheduler 1202.

Another new, interesting show is called Music Tournament Show ("MTS"). The MTS show is a tournament in which the "players" are artists (e.g., individual artists or bands) or videos. A first portion of a schedule for an episode of MTS is planned as the set of players are known before the episode airs. During the first chapter of the episode, two of the "players" are selected to face off against each other. That is, the viewers pick a winner by casting votes. The player with the most votes wins and is propelled into the next round of the tournament, which may begin at chapter n of the episode. During the next chapter, the next two players face off and the winner goes to the next round. The process repeats until the first round is complete. If there are eight players, the first round may end during or at the conclusion of the fourth chapter of the episode. When the second round of the tournament begins (e.g., the fifth chapter of the episode—or maybe sixth chapter because the fifth chapter is a commercial break), a winner from the first round faces off against a winner from the second round. As is evident from the above description, the schedule that will be used for the chapters after chapter four (assuming only eight players) can not be known prior to the start of the episode, and this creates scheduling difficulties. However, system 1200 can be configured to overcome these difficulties by performing the process shown in FIG. 20.

Figure 20:
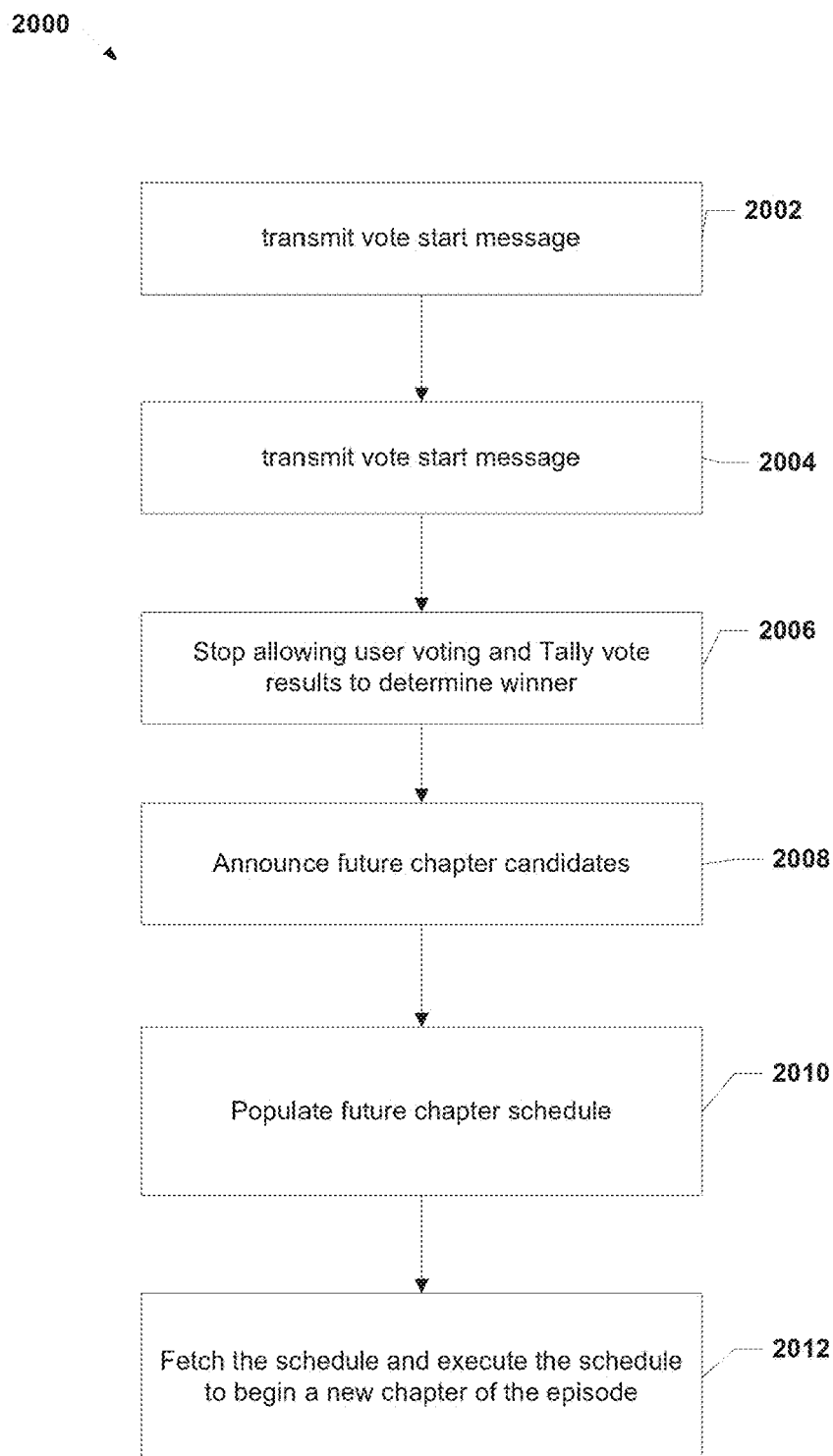
FIG. 20 is a flow chart illustrating a process, according to an embodiment of the invention.
Figure 21:
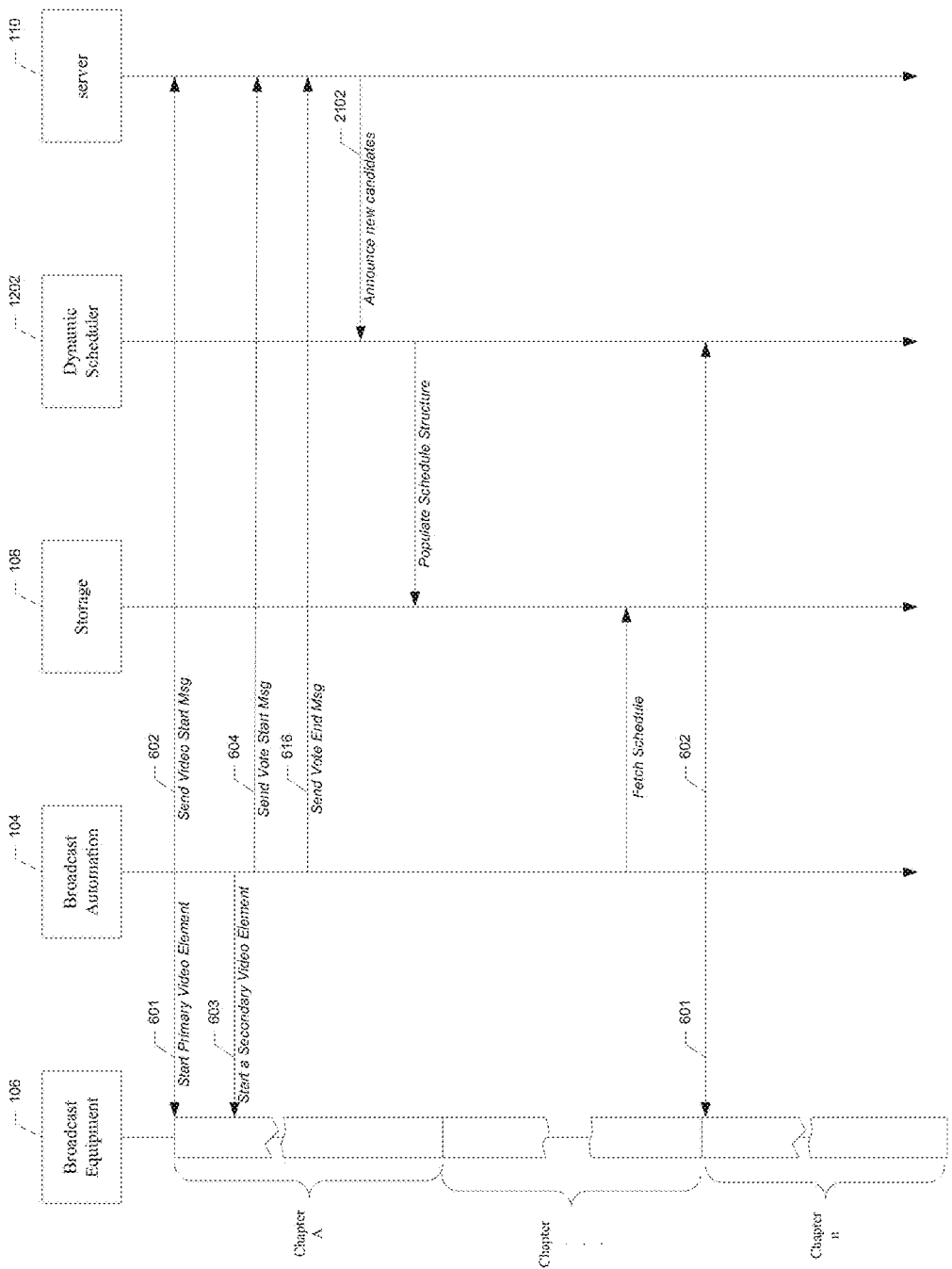
FIG. 21 is a data flow diagram illustrating an example data flow.

Referring now to FIG. 20, FIG. 20 is a flow chart illustrating a process 2000 according to an embodiment of the invention. Process 2000 may begin in step 2002, where automation system 104 transmits during a chapter of an episode a vote start message 602 (see the data flow diagram shown in FIG. 21) to signal the beginning of a voting period. Some time later during the chapter, system 104 transmits a vote stop message 604, which is received by server 110 (step 2004). In response, server 110 determines the winner of the vote (step 2006). In step 2008, server 110 transmits to scheduler 1202 one or more messages 2102 identifying one or more winners who have been voted to the next round of the tournament. In step 2010, scheduler 1202, using the information received in message(s) 2102, may populate one or more schedule structures for one or more future chapters (e.g., chapters n, n+1, and n+2). In step 2012, automation system uses one of the schedules populated in step 2010 to, possibly among other things, produce a video stream 181 for the chapter associated with the schedule by transmitting control signals to equipment 106, as described herein.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A broadcast system comprising:
a transmitter configured to transmit a video stream so that the video stream is received by a plurality of end user devices, the video stream containing video data corresponding to a particular video; and
an automation system separate from the transmitter, wherein
the automation system is configured to send a first trigger message to the transmitter at a first predefined time, and
the automation system is further configured to transmit a second trigger message is to the end user devices at a second predefined time, wherein the second trigger message is transmitted separately from the video stream, and
the second trigger message is configured to cause the end user devices to perform a predefined action based on information contained in the trigger message.

2. The broadcast system of claim 1, wherein the first trigger message is sent via a different communication path than the second trigger message.

3. The broadcast system of claim 2, wherein the second trigger message is synchronized with the video data.

4. The broadcast system of claim 1, wherein the second trigger message is sent via the same communication path as the video stream.

5. The broadcast system of claim 4, wherein the second trigger message is sent using a first elementary stream of a transport stream and the video stream is sent using a second elementary stream of said transport stream, wherein the first elementary stream is associated with a first packet identifier (PID) and the second elementary stream is associated with a second PID that is different than the first PID.

6. The broadcast system of claim 1, further comprising:
a server configured to provide an application to the end user devices, wherein the application is operable to (1) receive the video stream and (2) use the received video data to display on a display of the communication device the particular video.

7. The broadcast system of claim 6, wherein the server is configured to provide the application to an end user device in response to receiving a particular request from the end user device.

8. The broadcast system of claim 1, wherein second trigger message is received by each of the plurality of end user devices substantially simultaneously.

9. The broadcast system of claim 8, further comprising a message relay, wherein the automation system is configured to transmit said second trigger message to said message relay and the message relay is configured to multicast said second trigger message so that it is received by each of the plurality of end user devices.

10. The broadcast system of claim 8, wherein said plurality of end user devices are located remotely from said automation system.

11. The broadcast system of claim 10, wherein the second trigger message is configured to cause an application running on an end user device that receives the message to perform the particular action.

12. The broadcast system of claim 11, wherein
the second trigger message is configured to cause an application running on an end user device that receives the message to transmit a request for information to a server, which is configured to respond to the request for information by transmitting requested information to the application, and
the application is configured to display at least some of the requested information after receiving the information from the server.

13. The broadcast system of claim 10, wherein the second trigger message is configured to cause an application running on the end user device to update a graphical user interface displayed on a display screen of the device.

14. The broadcast system of claim 1, wherein the transmitter is configured such that, in response to receiving the first trigger message, the transmitter includes an overlay element in the video stream.

15. The broadcast system of claim 14, wherein the overlay element is a still image.

16. The broadcast system of claim 1, wherein
the first trigger message comprises a video file identifier identifying a video file, and the transmitter is configured such that, in response to receiving the first trigger message, the transmitter queues for transmission the video file identified by the video file identifier included in the first trigger message.

17. The broadcast system of claim 1, wherein
the broadcast system further comprises a server, and
the automation system is configured such that, based on a schedule, the broadcast automation transmits the second trigger message to the server and to the plurality of end user devices.

18. The broadcast system of claim 17, wherein
the broadcast system further comprises a message relay, and
the automation system is configured to transmit the second trigger message to plurality of end user devices by providing the message to the message relay.

19. The broadcast system of claim 1, further comprising a storage device storing a schedule, wherein
the schedule is configured to cause the automation system to send, at a first point in time specified in the schedule, i) the first trigger message to the transmitter and ii) the second trigger message to the end user devices, the first trigger message including a video identifier identifying a video and the second trigger message including a video identifier identifying said video;
the schedule is further configured to cause the automation system to send, at a second point in time specified in the schedule, i) a third trigger message to the transmitter and ii) a fourth trigger message to the end user devices.

20. A method for providing interactive video programming to a plurality of end users, the method comprising:
creating a schedule for an episode of a show, wherein the schedule specifies a first time at which a first trigger message should be sent to a video stream transmitter and the schedule also specifies a second time at which a second trigger message should be sent so that the second trigger message is received by at least i) a first application running on a first running on a first communication device that is located remotely from the video stream transmitter and an automation system and ii) a second application running on a second communication device that is located remotely from the video stream transmitter, the automation system, and the first communication device;
using the video stream transmitter to transmit a first video stream comprising encoded video data corresponding to the episode of the show;
in accordance with the schedule, the automation system, which is separate from the video stream transmitter, transmitting the first trigger message to the video stream transmitter; and
in accordance with the schedule, the automation system transmitting the second trigger message so that the second trigger message is received by: (1) the first application and (2) the second application, wherein
the second trigger message is configured to cause (1) the first application to display information to an end user using the first communication device and (2) the second application to display the information to an end user using the second communication device, and
the second trigger message is transmitted separately from the video stream.

21. The method of claim 20, further comprising:
using the video stream transmitter to transmit a second video stream encoding said video data, wherein the first and second video streams are transmitted substantially simultaneously.

22. The method of claim 21, wherein the first video stream contains a video element not included in the second video stream.

23. The method of claim 21, further comprising:
receiving from a third communication device a request message;
in response to the request message, transmitting to the third communication device a third application, wherein the third application is configured to receive the second video stream and display the video data encoded in the video stream using a display screen of the communication device.

24. The method of claim 23, further comprising:
receiving from the third application a subscribe request; and
as a consequence of receiving the subscribe request, transmitting the second trigger message to the third application.

* * * * *